United States Patent
Bayesteh et al.

(10) Patent No.: US 11,474,197 B2
(45) Date of Patent: Oct. 18, 2022

(54) METHOD AND APPARATUS FOR COMMUNICATION AND SENSING IN WIRELESS COMMUNICATION NETWORK OPERATING IN HALF-DUPLEX MODE

(71) Applicants: Alireza Bayesteh, Ottawa (CA); Mohammadhadi Baligh, Ottawa (CA); Jianglei Ma, Ottawa (CA)

(72) Inventors: Alireza Bayesteh, Ottawa (CA); Mohammadhadi Baligh, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 16/818,555

(22) Filed: Mar. 13, 2020

(65) Prior Publication Data
US 2021/0286045 A1    Sep. 16, 2021

(51) Int. Cl.
*H04W 16/00* (2009.01)
*G01S 7/00* (2006.01)
*H04L 5/14* (2006.01)

(52) U.S. Cl.
CPC ............... *G01S 7/006* (2013.01); *H04L 5/14* (2013.01)

(58) Field of Classification Search
CPC . G01S 1/02; G01S 7/003; G01S 7/006; G01S 7/02; G01S 7/023; G01S 7/417; G01S 7/484; G01S 7/4861; G01S 7/52038; G01S 13/003; G01S 13/08; G01S 13/24; G01S 13/282; G01S 13/343; G01S 13/345; G01S 13/42; G01S 13/584; G01S 13/765;

(Continued)

(56) References Cited

U.S. PATENT DOCUMENTS 9,791,550 B2 * 10/2017 Mckitterick ............... G01S 7/35
10,855,328 B1 * 12/2020 Gulati ................. H04L 27/2628
(Continued)

FOREIGN PATENT DOCUMENTS

| CN | 102116860 A | 7/2011 |
| CN | 104515981 A | 4/2015 |

(Continued)

OTHER PUBLICATIONS

Rahman et al., Framework for a Perceptive Mobile Network using Joint Communication and Radar Sensing, IEEE, 14 pages, Jan. 16, 2019.*

(Continued)

*Primary Examiner* — Frank Duong

(57) ABSTRACT

Methods and apparatus are provided for integrated communication and sensing. For example, an electronic device may transmit a radio frequency (RF) pulse signal in the active phase of a periodic sensing cycle, and sense in the passive phase of the sensing cycle, a reflection of the RF pulse signal reflected from an object. The RF pulse signal is defined by a waveform for carrying communication data between electronic devices. The sensed RF pulse signal is at least a portion of the transmitted or reflected RF pulse signal, wherein the portion is equal to or greater than a threshold value for the object being within a sensing range of the first electronic device. The electronic device may also receive a communication signal from another electronic device during the passive phase.

20 Claims, 17 Drawing Sheets

(58) Field of Classification Search
CPC ........ G01S 13/86; G01S 13/93; G01S 13/931; G01S 17/26; G01S 2013/9316; G01S 2205/002; H03D 3/007; H03D 7/166; H04B 1/10; H04B 1/16; H04B 1/69; H04B 10/5561; H04B 2001/6912; H04B 7/0413; H04B 7/0452; H01B 1/692; H01B 1/707; H01B 1/7073; H01B 1/7097; H01B 1/7216; H01B 1/72628; H04J 2013/0037; H04J 13/004; H04J 13/0059; H04J 13/0062; H04L 27/2273; H04L 27/3863; H04L 2027/0067; H04L 5/14; H04W 16/14
See application file for complete search history.

(56) References Cited

U.S. PATENT DOCUMENTS

| | | | | |
|---|---|---|---|---|
| 10,996,311 | B2* | 5/2021 | Roger | G01S 13/584 |
| 2007/0139253 | A1* | 6/2007 | Meyers | G01S 13/106 |
| | | | | 342/60 |
| 2016/0131753 | A1* | 5/2016 | Brown | G01S 13/931 |
| | | | | 342/128 |
| 2018/0199377 | A1* | 7/2018 | Sanderovich | H04W 74/0816 |
| 2020/0150263 | A1* | 5/2020 | Eitan | G01S 13/003 |
| 2022/0003859 | A1* | 1/2022 | Park | G01S 7/352 |
| 2022/0030626 | A1* | 1/2022 | Bayesteh | H04W 74/0808 |
| 2022/0141804 | A1* | 5/2022 | Bayesteh | H04W 8/24 |
| | | | | 370/329 |

FOREIGN PATENT DOCUMENTS

| | | |
|---|---|---|
| CN | 104614723 A | 5/2015 |
| WO | 2017221080 A1 | 12/2017 |
| WO | WO 2018/182723 * | 10/2018 |

OTHER PUBLICATIONS

Hassanien et al., Uplink Signaling and Receive Beamforming for Dual-Function Radar Communications, IEEE, 5 pages, 2018.*
Han et al., Radar and Radio Data Fusion Platform for Future Intelligent Transportation System, EuMA, 4 pages, Oct. 1, 2010.*

* cited by examiner

METHOD AND APPARATUS FOR COMMUNICATION AND SENSING IN WIRELESS COMMUNICATION NETWORK OPERATING IN HALF-DUPLEX MODE

TECHNICAL FIELD

The present disclosure relates generally to wireless communications, and in particular embodiments, to communication and sensing in half-duplex communications networks.

BACKGROUND

In some wireless communication networks, electronic devices, such as base stations (BS), user equipment (UE), or the like, wirelessly communicate with each other to send or receive data between one another. For example, a wireless communication from a UE to a BS is referred to as an uplink (UL) communication, a wireless communication from a BS to a UE is referred to as a downlink (DL) communication, and a wireless communication from a first UE to a second UE is referred to as a sidelink (SL) communication, or a device-to-device (D2D) communication.

Existing commercial wireless communications networks are all half-duplex (HDX) networks, where all communicating nodes in the network operate in the HDX mode. A node operating in HDX cannot both transmit and receive using the same physical resources (time, frequency, etc.); conversely, a full-duplex (FDX) capable node can transmit and receive using the same physical resources. Even if FDX communications networks become practical in the future, it is expected at least some of the nodes in the network will still be HDX nodes, as HDX nodes or devices can be built with less complex structures and produced at lower costs. For example, FDX implementation is more challenging at higher frequencies (e.g. in the millimeter wave bands), and very challenging for small and low-cost nodes or devices, such as femtocells or UEs.

It has been recognized that it is beneficial to integrate communication and sensing in some wireless communications networks. Sensing refers to an operation to detect a target's range, velocity, and/or shape. Radar is a common example of sensing. It is thus desirable to provide improved systems and methods for sensing and communication integration in wireless communications networks operating in the HDX mode.

SUMMARY

Example embodiments disclosed herein relate to integrated communication and sensing, particularly integrated communication and sensing in wireless communications networks. In some embodiments, at least some network entities, nodes, or devices in the network may operate in the half-duplex (HDX) mode. A signal transmitted by a network entity, node, or device is defined by a waveform for both carrying communication data and sensing at least a portion of the transmitted or reflected signal that is reflected from an object within a sensing range. The waveform may be designed and structured with a view to balance or optimize sensing performance and efficient utilization of communication resources.

Thus, according to an aspect of the disclosure, a first electronic device transmits a radio frequency (RF) pulse signal in an active phase of a periodic sensing cycle, and senses a reflection of the RF pulse signal reflected from an object in a passive phase of the sensing cycle. The RF pulse signal is defined by a waveform for carrying communication data between the first electronic device and a second electronic device. The sensed RF pulse signal is at least a portion of the transmitted or reflected RF pulse signal, wherein the sensed portion is equal to or greater than a threshold value for the object being within a sensing range of the first electronic device.

In some embodiments of this aspect, the first electronic device may also receive a communication signal from the second electronic device or another electronic device during the passive phase. The communication signal may be defined by the waveform. A control signaling signal may be provided to support integrated communication and sensing. The control signaling signal may be indicative of one or more signal parameters associated with the RF pulse signal such that the sensed RF pulse signal is the at least the portion of the transmitted or reflected RF pulse signal when the object is within the sensing range of the first electronic device. The control signaling signal may be transmitted to and received by the first electronic device and optionally one or more other electronic devices including the second electronic device. The periodic sensing cycle may comprise a plurality of subcycles, each of which may have an active phase and a passive phase. The RF pulse signal may comprise a signaling portion for signaling parameters associated with a subsequent RF pulse signal to be transmitted by the first electronic device. The signaling portion may comprise an indication of one or more of bandwidth, frame structure, subcycle index of each subcycle that comprises encoded data, waveform, numerology, or pulse shape.

According to another aspect of the disclosure, an apparatus comprises a transmitter and a receiver, which may be separate components or integrated into a transceiver. The transmitter is configured to transmit a RF pulse signal in an active phase of a periodic sensing cycle. The RF pulse signal is defined by a waveform for carrying communication data. The receiver is configured to sense, in a passive phase of the periodic sensing cycle, a reflection of the RF pulse signal reflected from an object. The sensed RF pulse signal is at least a portion of the transmitted or reflected RF pulse signal, the portion being equal to or greater than a threshold value for the object being within a sensing range of the apparatus.

In some embodiments of this aspect, the receiver may be further configured to receive a communication signal during the passive phase, where the communication signal is defined by the waveform. The receiver may be further configured to receive a control signaling signal indicative of one or more signal parameters associated with the RF pulse signal such that the sensed RF pulse signal is the at least the portion of the transmitted or reflected RF pulse signal when the object is within the sensing range of the apparatus. The periodic sensing cycle may comprise a plurality of subcycles, each of which may include an active phase and a passive phase. The RF pulse signal may comprise a signaling portion for signaling parameters associated with a subsequent RF pulse signal to be transmitted by the apparatus, the signaling portion comprising an indication of one or more of bandwidth, frame structure, subcycle index of each subcycle that comprises encoded data, waveform, numerology, or pulse shape.

In a further aspect, the present disclosure provides a method in which, a second electronic device receives a radio frequency (RF) pulse signal transmitted from a first electronic device in an active phase of a periodic sensing cycle, and transmits, in a passive phase of the periodic sensing cycle, a communication signal. Both the RF pulse signal and the communications signal are defined by a waveform. The RF pulse signal is defined by the waveform for (i) carrying communication data between the first electronic device and the second electronic device and (ii) sensing by the first electronic device, during a passive phase of the periodic sensing cycle, a reflection of the RF pulse signal reflected from an object, where the sensed RF pulse signal is at least a portion of the transmitted or reflected RF pulse signal, the portion being equal to or greater than a threshold value for the object being within a sensing range of the first electronic device.

In some embodiments of this method, the second electronic device may further sense a sensing signal defined by the waveform. A control signaling signal may be transmitted or received, which is indicative of one or more signal parameters associated with the RF pulse signal such that the sensed RF pulse signal is the at least the portion of transmitted or reflected RF pulse signal when the object is within the sensing range of the first electronic device. The periodic sensing cycle may comprise a plurality of subcycles, each of which may include an active phase and a passive phase. The RF pulse signal may comprise a signaling portion for signaling parameters associated with a subsequent RF pulse signal to be transmitted by the first electronic device, the signaling portion comprising an indication of one or more of bandwidth, frame structure, subcycle index of each subcycle that comprises encoded data, waveform, numerology; or pulse shape.

In another aspect of the disclosure, there is provided an apparatus. The apparatus comprises a receiver and a transmitter, which may be separate components or integrated into a transceiver. The receiver is configured to receive a radio frequency (RF) pulse signal transmitted from an electronic device in an active phase of a periodic sensing cycle. The RF pulse signal is defined by a waveform for (i) carrying communication data and (ii) sensing by the electronic device, during a passive phase of the periodic sensing cycle, a reflection of the RF pulse signal reflected from an object. The sensed RF pulse signal is at least a portion of the transmitted or reflected RF pulse signal, and the portion is equal to or greater than a threshold value for the object being within a sensing range of the electronic device. The transmitter is configured to transmit, in the passive phase of the periodic sensing cycle, a communication signal defined by the waveform.

In some embodiments of this apparatus, the receiver may be further configured to sense a sensing signal defined by the waveform. The transmitter or receiver may be further configured to transmit or receive a control signaling signal indicative of one or more signal parameters associated with the RF pulse signal such that the sensed RF pulse signal is the at least the portion of transmitted or reflected RF pulse signal when the object is within the sensing range of the electronic device. The periodic sensing cycle may comprise a plurality of subcycles, each of which includes an active phase and a passive phase. The RF pulse signal may comprise a signaling portion for signaling parameters associated with a subsequent RF pulse signal to be transmitted by the first electronic device, the signaling portion comprising an indication of one or more of bandwidth, frame structure, subcycle index of each subcycle that comprises encoded data, waveform, numerology; or pulse shape.

An apparatus described herein may have a transmitter, receiver, or transceiver that includes a radar, such as a monostatic radar. The radar may operate in the HDX mode for sensing or communication, or both.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
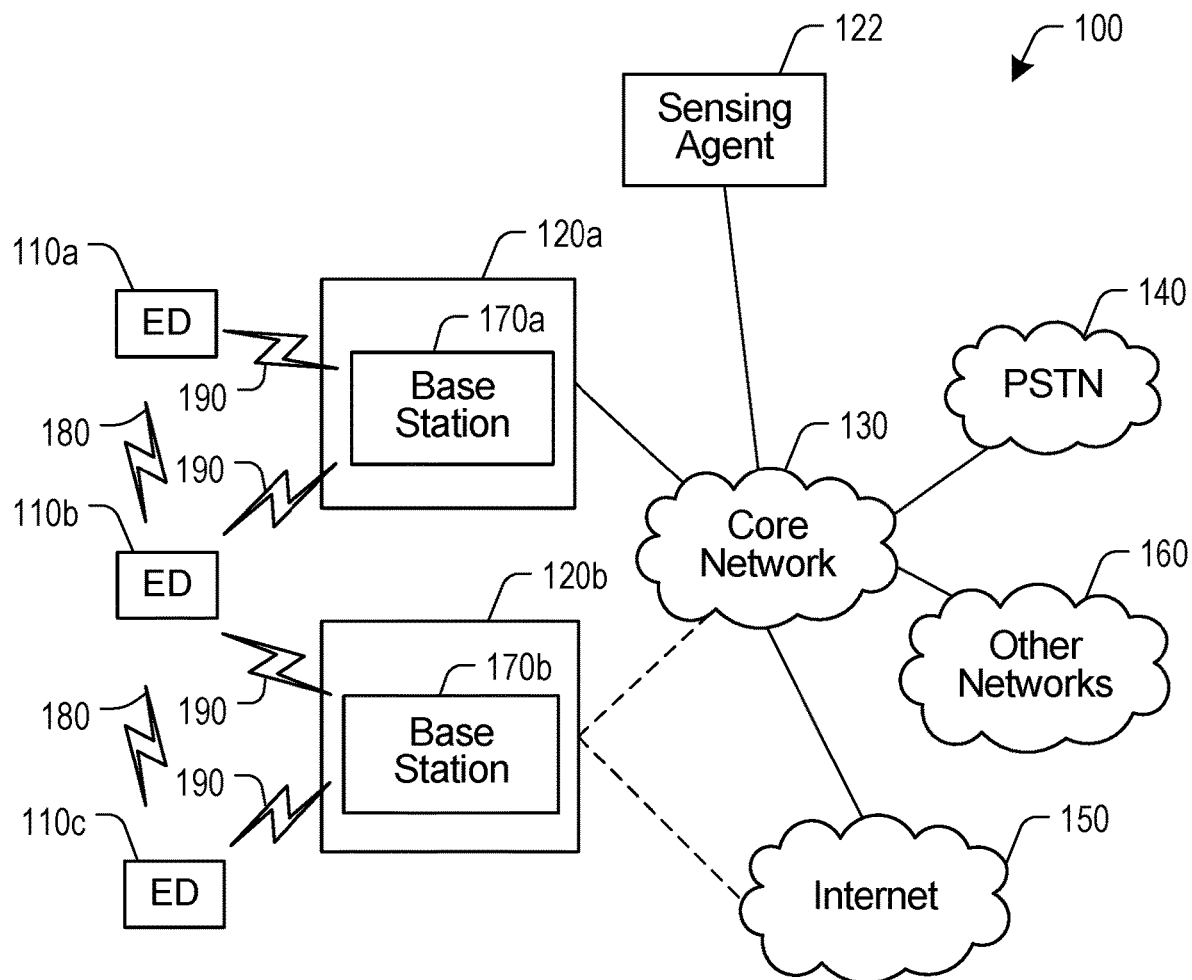
FIG. 1 is a schematic diagram of a communication system in which embodiments of the disclosure may occur.

For illustrative purposes, specific example embodiments will now be explained in greater detail below in conjunction with the figures.

Radar sensing has been used for detecting a target's range (distance from the radar), velocity, and shape. For example, after a radar signal is transmitted, a reflection of that radar signal off of an object at a distance from the radar can be received and measured by the radar. Such reflection can indicate certain properties of the object, including its range, location, shape, and velocity. The range of the object can be determined based on the time-of-flight for the radar signal. The location of the object can be determined based on the range of the object and the direction that the radar signal was transmitted and received. For instance, beamforming can be used to transmit radar signals in different directions. The velocity or speed of the object can be determined based on a change in the object's position over time, or based on the Doppler shift of the received radar signal as can be understood by those skilled in the art.

In recent years, there have been proposals to integrate radar sensing with wireless communications. Radar sensing and communications can use the same hardware and the same waveform in order to perform in an integrated fashion. Known proposed solutions for radar sensing require either monostatic radar sensing with FDX capability at a sensing node (SeN), or multi-static radar sensing with HDX or FDX nodes.

A sensing node with a monostatic radar, which can only operate in the HDX mode, cannot detect and receive the reflected sensing signal when the node is transmitting. A conventional technique to perform monostatic radar sensing is to operate the radar cyclically alternating between transmission and reception, and such radars are known as pulsed radars. The radar signal transmitted by a pulsed radar has a waveform consisting of repeated pulses. Since the duty cycle, i.e. the ratio of the length of the transmission period to the total length of both transmission and reception periods, in a conventional pulsed radar system is typically very low, using the signal structure of such a system for integrated sensing and communication might result in very low spectral efficiency, which is not suitable for communications.

Due to some inherent limitations of pulsed radars, it remains challenging to design suitable signal structures and waveforms for pulsed or other monostatic radars for use in integrated communication and sensing.

In brief overview, an embodiment disclosed herein relates to methods, systems and devices for integrated communication and sensing in a wireless communications network, operated in a half-duplex mode and with the use of monostatic radars. The waveform of the radar pulse signal is designed and structured to improve or optimize system operation performance and efficiency. For example, a radio frequency (RF) pulse signal may be defined by a waveform for both communication and sensing in periodic sensing cycles. An electronic device may transmit the RF pulse signal in an active phase of a periodic sensing cycle and sense a reflection of the RF pulse signal reflected from an object in a passive phase of the sensing cycle. Waveform may be structured for carrying communication data between electronic devices. The sensed reflection of the RF pulse signal is at least a portion of the transmitted or reflected RF pulse signal, wherein the portion is equal to or greater than a threshold value for the object being within a sensing range of the electronic device. The electronic device may also receive a communication signal from another electronic device during the passive phase.

In some embodiments, the RF pulse signal, which may be a radar signal, may be structured to optimize the duty cycle of the radar so as to meet both communication and sensing requirements while maximizing operation performance and efficiency. In a particular embodiment, the pulse signal waveform is configured and structured so that the ratio of the duration of the active phase and the duration of the passive phase in a sensing cycle or subcycle is greater than a predetermined threshold ratio, and at least a predetermined proportion of the reflection reflected from targets within a given range is received by the radar.

In an embodiment disclosed herein, the RF pulse signal and its frame structure and waveform are designed and structured to address certain challenges in conventional radar systems. In general, the waveform can be represented by the pulse width (PW) or pulse duration ($\tau$), and pulse repetition interval (PRI) Tor pulse repetition frequency (RRF) $f_p$. The duty cycle ($D_c$) of a radar is the product of the PW and RRF, or $D_c = \tau f_p = \tau/T$.

For example, it has been recognized that a challenge in designing the frame structure and waveform for pulsed radars is that the reception time windows of the reflections are dependent on the target range, which can vary, and therefore not predictable. Thus, it is difficult to maximize the transmission time while ensure reception of the reflected signal, particularly if the target range needs to be unambiguously determined in a conventional radar system.

On the one hand, if the transmission period is too short, i.e. the pulse width is too narrow, the duty cycle will be very small. For example, if the pulse width is 1 ns and the desired radar range is 60 m, since it will require a reception period of at least 400 ns in order to ensure a target 60 m away can be sensed, the resulting duty cycle is only about 1/401. A small duty cycle indicates less efficient use of the radar, particularly when sensing and communication are integrated because the radar signal is also used for communicating data, and for communications purposes it is desirable and more efficient to have longer transmission time so more data can be transmitted. A smaller duty cycle means less time is available for transmission of data. A smaller duty cycle also means a lower average power output at a given peak radar power.

On the other hand, if the transmission period is too long, most of the reflected sensing signal would be missed, and most of the transmitted signal would be wasted for the purpose of sensing. For example, if the transmission period is 10 µs, which may be required if a Sensing Node (SeN) needs to transmit a cyclic prefix (CP) orthogonal frequency division multiplexing (OFDM) symbol (CP-OFDM symbol) of a length of 10 µs and the OFDM subcarrier spacing (SCS) equals to 120 kHz, about 96% of the reflection of the sensing signal from targets within the range of 60 m will be lost during the transmission period and cannot be received. The radar may not even be able to detect targets at closer ranges, such as targets that are only a few meters away from the SeN.

It has been recognized that more efficient signal design would be desirable for half-duplex monostatic sensing, so that efficient resource allocation and efficient signal processing can be balanced or optimized. In this regard, the present disclosure relates to aspects of signal design, including signal frame structure design, and waveform and numerology design.

In some embodiments, the signal is designed to achieve one or more of improved sensing performance, for example target positioning accuracy; and minimizing negative impact or effect, or interference, of sensing on other applications or functions performed by the sensing node or electronic device. For example, it may be desirable to reduce or minimize interference of sensing signal with adjacent communication bands, by minimizing the out-of-band sensing signal radiation.

In some embodiments, it may also be desirable to provide data and sensing signal multiplexing within the radar and signal designs described herein.

Conveniently, embodiments disclosed herein can address one or more of the shortcomings or problems in conventional monostatic sensing when integrated data communication, as will be further discussed below.

As alluded to above, embodiments disclosed herein relate to wireless communications networks operating in the half-duplex mode. A duplex communication system is a point-to-point system, in which two devices (or nodes) at different points, e.g. A and B, can communicate in both directions, e.g. from A to B and from B to A. A duplex system can be a full-duplex (FDX) system or a half-duplex (HDX) system. In FDX communication, communication can occur in both directions (e.g. from A to B and from B to A in the above example) using the same time and frequency resources, such as through different communication channels or using different hardware. In HDX communication, communications can still occur in each one of the two directions (e.g. from A to B, or from B to A, in the above example), but only in one direction at a time (e.g., in time division duplexing) or only in one frequency band at a time (e.g., in frequency division duplexing). In other words, when a communicating point is communicating in the HDX mode, it cannot both transmit and receive signals using the same time and frequency resources.

Embodiments disclosed herein also relate to the use of radar for sensing and communication.

Radar is an electronic means of sensing that includes a transmitter for transmitting a radio frequency (RF) signal and a receiver for receiving a reflection of the signal reflected from a distant object for detecting the presence and properties (i.e., characteristics) of the object. The transmitter and receiver may be integrated as a transceiver, and may include one or more antenna for transmitting or receiving the signal. The properties of the object that can be determined based on the detected reflection may include, for example, the distance (i.e., range), location, velocity, size, and shape of the object. The radio signal includes electromagnetic waves in the radio domain, typically having a frequency of approximately 3 kHz to approximately 300 GHz, or a wavelength of approximately 1 mm to approximately 100 km.

Generally, radar may operate using continuous or pulse radio waves. The embodiments described herein relate to radio signals with pulse waves.

Radar systems can be monostatic, bi-static, or multi-static. In a monostatic radar system, the radar signal transmitter and receiver are co-located, such as being integrated in a transceiver. In a bi-static radar system, the transmitter and receiver are spatially separated, and the distance of separation is comparable to, or larger than, the expected target distance (often referred to as the range). In a multi-static radar, two or more radar components are spatially diverse but with a shared area of coverage. A multi-static radar is also referred to as a multisite or netted radar.

Sensing signals or sensing reference signals can be used to determine properties of a wireless communication network and its surrounding environment. Such properties may include the location and velocity of an object such as a user equipment (UE), or a scattering or reflecting object that obstructs communication signals such as UEs, buildings or other physical structures.

Sensing agents are nodes in a network that can assist in the sensing operation. These nodes can be stand-alone nodes dedicated to just sensing operations, or other nodes, for example transmit points (TPs) including transmit and receive points (TRPs) or UEs, which can perform both sensing operations and communication transmissions. In cases where the sensing agents are implemented as stand-alone nodes, the sensing can be implemented in the vicinity of some corresponding TPs or TRPs to ensure that the distance between the TRP and a target is approximately the same as the distance between the sensing agent and the target to simplify range estimation. Another condition that needs consideration is that the sensing agent and the TRP are synchronized in time and frequency (for example, by accessing the same clock for time synchronization).

A sensing agent operating in a HDX monostatic mode can be considered to perform active sensing and passive sensing, as the sensing agent is operated to cyclically alternate between an active sensing phase (also referred to herein as the active phase) and a passive sensing phase (also referred to herein as the passive phase). During active sensing, or in the active phase, the sensing agent transmits a sensing signal. During passive sensing, or in the passive phase, the sensing agent detects a reflection of the sensing signal. During passive sensing, the sensing agent does not transmit any signal, and during active sensing the sensing agent is not able to receive any signal.

Some aspects of the present disclosure relate to the integration of sensing and wireless communications. For example, wireless communication networks may configure and implement both sensing signals and communication signals. Conventional sensing signals, which may also be referred to as sensing reference signals, are used to determine properties of the environment, and do not carry any information or data for the purpose of communications. Communication signals, on the other hand, are signals that carry information or data between network entities. A possible benefit of implementing both sensing and communications operations is that the network can configure communication signals based on the information determined from sensing. This type of communication is referred to as sensing-assisted communications. For example, sensing may determine the location of an intended receiver and enable narrow beamforming to that receiver. Communication-assisted sensing is also contemplated. Sensing signals and communication signals may be implemented using the same hardware, and may have the same waveform, in order to operate in an integrated fashion. Configurations and designs of sensing signals from the point of view of a radio access node (RAN) have been contemplated.

A challenge to configuring sensing signals in a wireless communication network is how to efficiently achieve the coexistence of sensing signals and communication signals. Sensing signals should be configured such that a sensing operation performed by one network entity does not significantly degrade the communications performance or the sensing performance of other network entities. By way of example, interference between sensing signals and communication signals should be limited.

There are fundamental limits on the range resolution and velocity resolution of a sensing signal such as a radar signal. These resolution limits depend on the transmission time ($T_w$), bandwidth (BW, also BW) and the carrier frequency ($f_c$) of the radar signal. These fundamental limits exist regardless of the waveform and transmission scheme of the radar signal. The range resolution ($\Delta R$) and velocity resolution ($\Delta v$) of radar sensing having the following respective lower limits: $\Delta R \geq c_0/2BW$, $\Delta v \geq c_0/2T_w f_c$, where $c_0$ denotes the speed of light. Thus, increasing the bandwidth can improve the range resolution, and increasing the transmission time or carrier frequency can improve the velocity resolution.

For example, if a target is 300 meters away, a delay between a received signal reflected from the target and the transmitted signal is 2 μs; hence, the duration of the active phase needs to be less than 2 μs to ensure the reflection from the target can be received by the sensing node in the passive phase. In reality, the constraint on pulse duration is more severe as there are reflectors and targets closer to the sensing node than 300 meters. Limiting the duration of the pulse may reduce the ability to integrate sensing with communications signals and equipment, which currently mainly utilizes OFDM waveforms. For example, in order to accommodate a cyclic prefix (CP), the symbol duration for OFDM transmissions may need to be much longer than 2 μs. A narrow-time sensing pulse can limit the accuracy of target velocity estimation.

While it is possible to multiplex sensing signals and communication signals by using time domain multiplexing (TDM), there may be significant signal overhead for such multiplexing. It is thus desirable to reduce such signal overhead.

Some embodiments disclosed herein relate more specifically to signal frame and waveform design for the sensing and communication signals. The waveform design may include design features related to single-carrier, multi-carrier, ultra-wide band (UWB) pulse, or Frequency-Modulated Continuous Wave (FMCW) waveforms, or the like.

In an embodiment, integrated data communication and sensing is performed in a wireless communications network operating in a half-duplex mode. The method includes operating a first electronic device to communicate with at least one second electronic device in a half-duplex communication mode, wherein the first electronic device comprises a monostatic sensing node configured to cyclically alternate between operation in an active phase and operation in a passive phase for a plurality of cycles, each cycle comprising a plurality of communication and sensing subcycles. In the active phase of a communication and sensing subcycle, a pulse signal is transmitted from the sensing node. The pulse signal may comprise a waveform structured to carry communication data. In the passive phase of the communication and sensing subcycle, the sensing node receives a communication signal from the at least one second electronic device, and also senses reflections of the pulse signal reflected from objects within a given sensing range, for sensing the objects. The range may be defined by the distance (d) from the sensing node that is between a minimum distance ($d_{min}$) and a maximum distance ($d_{max}$), i.e. $d_{min} \le d \le d_{max}$. The pulse signal has a frame structure and a waveform that are designed or selected to optimize and balance sensing performance and efficient resource allocation.

For example, the signal may have a frame structure and waveform selected to balance the need to provide an efficient duty cycle of the signal and the need to ensure adequate reception of the reflections of the pulse signal for sensing purposes.

In one embodiment, the duration ($t_a$) of the active phase and the duration ($t_p$) of the passive phase in each subcycle may be selected so that the ratio of $t_a/t_p$ is greater than a predetermined threshold ratio, and the pulse signal may also have a pulse structure selected to allow at least a predetermined proportion (α) of the reflected pulse signal to return to the sensing node during the passive phase when $d_{min} \le d \le d_{max}$. Generally, 0<α≤1. In some embodiments, 0<α<1. A smaller α will allow increased duty cycle, but if α is too small it may negatively affect the sensing performance. The value of α may represent the minimum proportion of a reflection received by the sensing node during the passive phase among all reflected signals. In some embodiments, the value of α may be selected so that the minimum proportion of any reflection received by the sensing node during the passive phase is still sufficient to provide effective and efficient sensing, or at least meet the minimum sensing requirements in the particular application.

It has been realized that to ensure efficient resource allocation, the duty cycle of the signal should be sufficiently high. In other words, the active phase, also referred to as the ON state or active sensing, and the passive phase, also referred to as OFF state or passive sensing, should be structured so that the ratio of the duration of the active phase over the duration of the passive phase in the signal cycles is not too small.

It has also been realized that to ensure efficient sensing, a minimum proportion of the reflected sensing signal should be received by the sensing node during the passive phase. The minimum proportion of received sensing signal should be sufficient to obtain the desired sensing parameters or information from the received reflection signal.

It may further improve performance if the active (ON) phase and the passive (OFF) phase are repeated in each sensing cycle to provide more robust range and Doppler estimation. That is, signals are transmitted and sensed over a plurality of sensing cycles, and each sensing cycle includes a plurality of subcycles, where each subcycle includes an active phase and a passive phase.

The signal may have different optional cycle structures.

In a first option, each of the active and passive phases has a fixed length of duration. That is, the duration of the active phases and the duration of the passive phases have the same or constant respective lengths over different subcycles or cycles. In some embodiments, the duration of the active phases and the duration of the passive phases have the same or constant respective lengths over different subcycles of a cycle, but are different over different cycles. The duration of the active phase and the duration of the passive phase may be the same or different, subject to the constraints discussed herein.

In a second option, one or both of the lengths of the active and passive phases may vary over different subcycles or cycles.

Embodiments of the sensing signal design as described herein may be implemented in a wireless communications network or system as illustrated in FIGS. 1, 2A-2C, and 4.

In particular, FIGS. 1, 2A, 2B and 2C illustrate examples of networks and devices that may implement any or all aspects of the present disclosure.

FIG. 1 illustrates an example communication system 100. In general, the system 100 enables multiple wireless or wired elements or entities to communicate data and other content. The purpose of the system 100 may be to provide content (e.g., voice, data, video, text, or the like) via broadcast, unicast, groupcast, narrowcast, user device to user device, or other communication techniques. The system 100 may operate more efficiently by sharing resources such as communication bandwidth.

In this example, the communication system 100 includes electronic devices (ED) 110a, 110b, and 110c (also individually or collectively referred to as ED 110), radio access networks (RANs) 120a and 120b (also individually or collectively referred to as RANs 120), a sensing agent 122, a core network 130, a public switched telephone network (PSTN) 140, the Internet 150, and other networks 160. While certain numbers of these components or elements are shown in FIG. 1, any reasonable number of these components or elements may be included in the system 100. While entities 110a-110c are identified as EDs in FIG. 1 expressly, it should be understood that other elements or entities shown in FIG. 1, for example sensing agent 122 and components of a network (120, 130, 140 and 150), such as a base station, may also be or include electronic devices.

The EDs 110 are configured to operate or communicate, or both, in the system 100. For example, one or more of the EDs 110 may be configured to transmit or receive, or both, via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), Internet of Things (IoT) device, personal digital assistant (PDA), smartphone, laptop, computer, touchpad, wireless sensor, or consumer electronics device. An ED 110 may be included or carried on a vehicle.

In FIG. 1, the RANs 120a-120b include base stations 170a-170b, respectively. Base stations 170a-170b may also be individually or collectively referred to as base station (BS) 170. Each base station 170a-170b is configured to wirelessly interface with one or more of the EDs 110 to enable access to any of the base stations 170a-170b, the core network 130, the PSTN 140, the internet 150, and the other networks 160. For example, the base stations 170 may include (or be) one or more of known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110 or BS 170 may be alternatively or additionally configured to interface, access, or communicate with any other base station 170, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

Any or all of the EDs 110 and BS 170 may be sensing nodes (SeNs) in the system 100. Sensing nodes are network entities that perform sensing by transmitting and receiving sensing signals. Some sensing nodes are communication equipment that perform both communications and sensing. However, it is possible that some sensing nodes do not perform communications, and are instead dedicated to sensing. The sensing agent 122 is an example of a sensing node that is dedicated to sensing. Unlike the EDs 110 and BS 170, the sensing agent 122 does not transmit or receive communication signals. However, the sensing agent 122 may communicate configuration information, sensing information, signaling information, or other information within the communication system 100. The sensing agent 122 may be in communication with the core network 130 to communicate information with the rest of the communication system 100. By way of example, the sensing agent 122 may determine the location of the ED 110a, and transmit this information to the base station 170a via the core network 130. Although only one sensing agent 122 is shown in FIG. 1, any number of sensing agents may be implemented in the communication system 100. In some embodiments, one or more sensing agents may be implemented at one or more of the RANs 120.

The EDs 110, BS 170 and sensing agent 122 are examples of network entities that can be configured to implement some or all of the functionalities or embodiments described herein. In the embodiment shown in FIG. 1, the base station 170a forms part of the RAN 120a, and the base station 170b forms part of the RAN 120b. A RAN 120 may include other base stations, one or more base station controllers (BSC), one or more radio network controllers (RNC), relay nodes, elements, or other devices. Any base station 170 may be a single element, as shown, or formed of multiple elements, distributed in the corresponding RAN, or otherwise. Each base station 170 transmits and receives wireless signals within a particular geographic region or area, sometimes referred to as a "cell" or "coverage area". A cell may be further divided into cell sectors, and a base station 170 may, for example, employ multiple transceivers to provide service to multiple sectors. In some embodiments, the cells may include pico or femto cells. In some embodiments, multiple non-co-located transceivers may be used for each cell, according to, for example, a multiple-input multiple-output (MIMO) technology. The number of RAN 120 shown in FIG. 1 is exemplary only. Any number of RAN may be contemplated or included in the communication system 100.

The BS 170 communicate with one or more of the EDs 110 over one or more air interfaces 190 using wireless communication links, for example with frequencies in the bandwidths of radio frequency (RF), microwave, infrared (IR), visible light communications (VLC) or the like. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), Space Division Multiple Access (SDMA), orthogonal FDMA (OFDMA), or single-carrier FDMA (SC-FDMA) in the air interfaces 190. In addition, the communication system 100 may operate in time division duplex (TDD) modes, or frequency division duplex (FDD) modes, or both TDD and FDD modes.

A BS 170 may implement Universal Mobile Telecommunication System (UMTS) Terrestrial Radio Access (UTRA) to establish an air interface 190 using wideband CDMA (WCDMA). ABS 170 may implement protocols such as High Speed Packet Access (HSPA), or Evolved HPSA (HSPA+), optionally including High Speed Downlink Packet Access (HSDPA) or High Speed Packet Uplink Access (HSUPA) or both. Alternatively, a BS 170 may establish an air interface 190 with Evolved UTMS Terrestrial Radio Access (E-UTRA) using Long-Term Evolution (LTE), LTE-A, New Radio (NR), or LTE-B, or a combination thereof. It is contemplated that the communication system 100 may use multiple channel access functionality, including such schemes as described above. Other radio technologies for implementing air interfaces may include technologies complying with one or more of the Institute of Electrical and Electronics Engineers (IEEE) standards, such as IEEE 802.11, 802.15, or 802.16; CDMA standards, such as CDMA2000 or CDMA20001x; the Evolution-Data Optimized (EV-DO) standards; Interim Standard (IS), such as IS-2000, IS-95, or IS-856; and Global System for Mobile Communications (GSM) standards, such as GSM, Enhanced Data Rates for GSM (EDGE), or GSM EDGE Radio Access Network (GERAN). Other multiple access schemes and wireless protocols may also be utilized.

The RANs 120a-120b are in communication with the core network 130 to provide the EDs 110a-110c with various services such as voice, data, and other services. The RANs 120a-120b, or the core network 130, may be in direct or indirect communication with one or more other RANs (not shown), which may or may not be directly served by core network 130, and may or may not employ the same radio access technology used by RAN 120*a* or RAN 120*b*. The core network 130 may also serve as a gateway access between (i) the RANs 120*a*-120*b* or EDs 110*a*-110*c*, or both, and (ii) other networks (such as the PSTN 140, the internet 150, and the other networks 160).

The EDs 110*a*-110*c* may communicate with one another over one or more sidelink (SL) air interfaces 180 using wireless communication links, such as in RF, microwave, IR, or other suitable frequency bands. The SL air interfaces 180 may utilize any suitable radio access technology, and may be substantially similar to the air interfaces 190 over which the EDs 110*a*-110*c* communication with one or more of the base stations 170*a*-170*c*, or they may be substantially different. For example, the communication system 100 may implement one or more channel access methods, such as CDMA, TDMA, FDMA, SDMA, OFDMA, or SC-FDMA in the SL air interfaces 180. In some embodiments, the SL air interfaces 180 may be, at least in part, implemented over an unlicensed spectrum. In addition, the SL air interfaces 180 may operate in TDD or FDD modes, or in both TDD and FDD modes.

Some or all of the EDs 110*a*-110*c* may include functionality for communicating with different wireless networks over different wireless links using different wireless technologies or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110 may be multimode devices capable of operation according to multiple radio access technologies, and incorporate multiple transceivers necessary to support multiple radio access technologies.

Figure 4A:
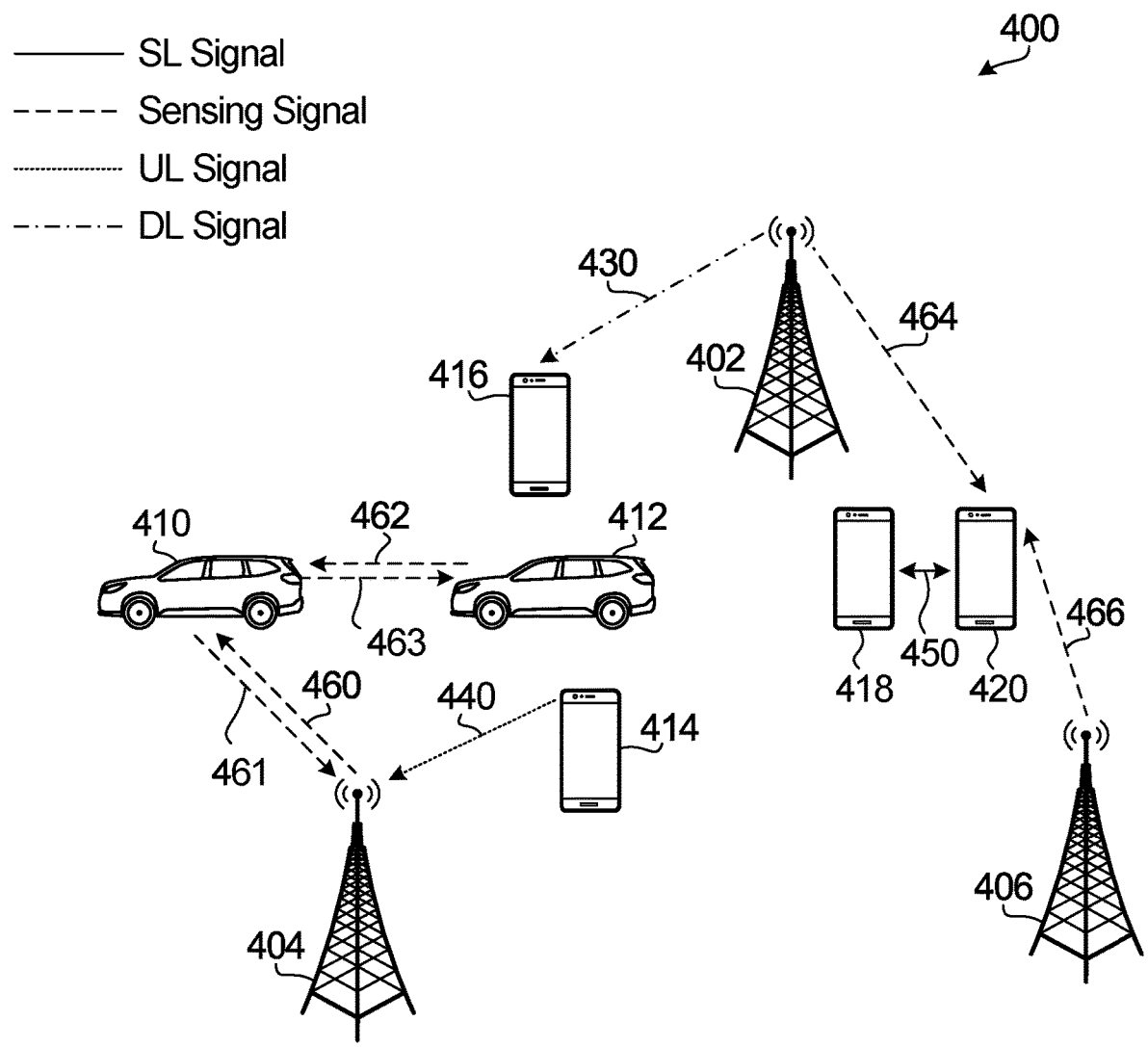
FIG. 4A is a schematic diagram illustrating a first example communication system implementing sensing according to aspects of the present disclosure.

The BS 170, EDs 110, and sensing agent 122 can perform or aid in sensing by transmitting and receiving sensing signals (not shown in FIG. 1 but see FIG. 4A). The sensing signals can be used to sense targets within the sensing range, or to determine properties of the communication system 100 and its surrounding environment. For example, sensing signals may be used to determine the location and velocity of an ED 110, or all of the EDs 110 within the sensing range, or the locations of other objects near the sensing point, which may be a BS 170, an ED 110, or the sensing agent 122. The sensing signals may utilize any suitable radio access technology. In some embodiments, sensing signals may have frequencies in the millimeter band or tera hertz (THz) band (also referred to as the extremely high frequency band). Possible advantages of millimeter/THz band include a relatively large amount of bandwidth available for sensing and a stronger reflection of the sensing signals from objects, as some materials reflect millimeter/THz waves more strongly than other radio bands. In embodiments disclosed herein, the sensing signals are configured and structured to facilitate integrated communication and sensing as noted earlier, and as will be further described below.

It should be understood that while sensing agent 122 is expressly identified as a sensing agent in FIG. 1, other EDs or entities such as base stations may also function as a sensing agent. Some or all of the EDs 110 and BS 170 may be configured to perform both communication and sensing functions, and may be configured to improve integrated communication and sensing as described elsewhere herein. An ED 110 or BS 170 may also be configured to include a sensing agent.

Figure 2A:
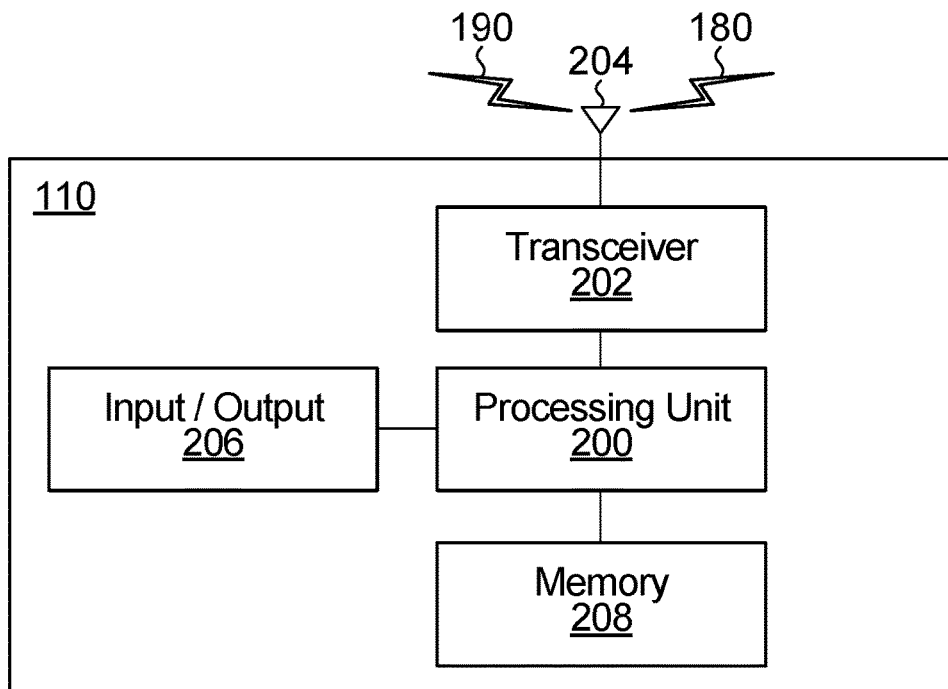
FIGS. 2A, 2B and 2C are block diagrams of an example user equipment, base station and sensing agent, respectively, according to aspects of the present disclosure.
Figure 2B:
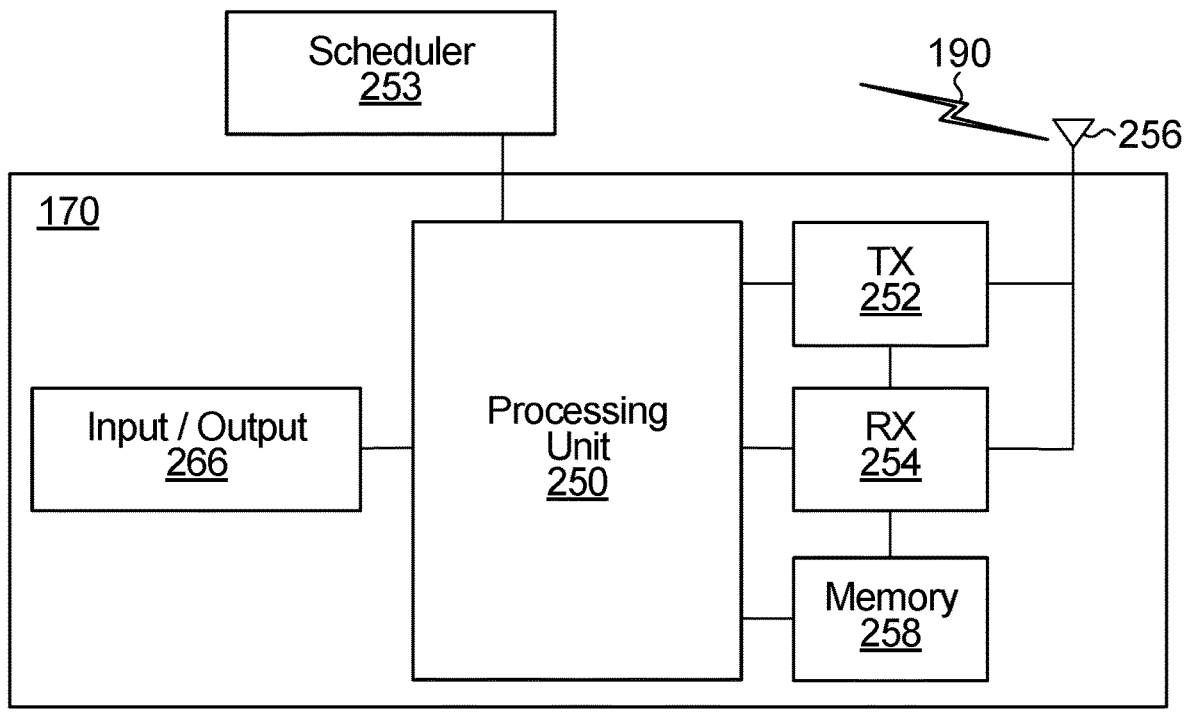
Figure 2C:
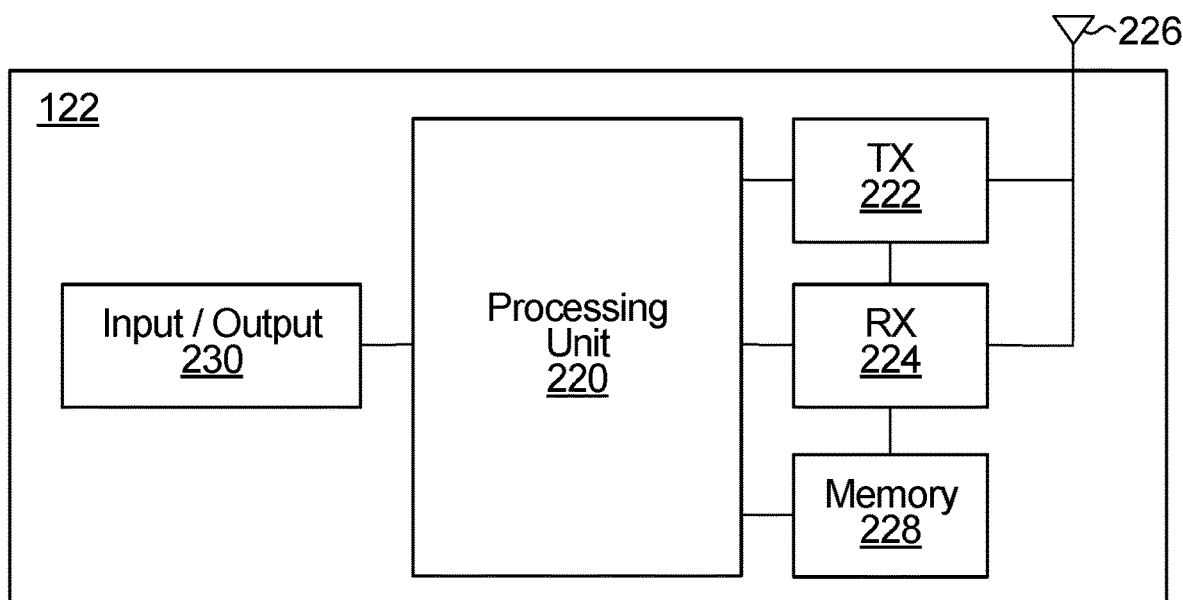

FIGS. 2A, 2B and 2C illustrate example devices that may implement the methods and teachings according to this disclosure. In particular, FIG. 2A illustrates an example ED 110, FIG. 2B illustrates an example base station 170, and FIG. 2C illustrates an example sensing agent 122. These components may be used in the system 100 or in any other suitable system.

As shown in FIG. 2A, the ED 110 includes at least one processing unit 200. The processing unit 200 implements various processing operations of the ED 110. For example, the processing unit 200 may perform signal coding, bit scrambling, data processing, power control, input/output processing, or any other functionality enabling the ED 110 to operate in the communication system 100. The processing unit 200 may also be configured to implement some or all of the functionality described in herein. Each processing unit 200 may include any suitable processing or computing device configured to perform one or more operations. Each processing unit 200 may, for example, include a microprocessor, microcontroller, digital signal processor, field programmable gate array, or application specific integrated circuit, or any combination thereof.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and processing signals received wirelessly or by wire. Each antenna 204 includes any suitable structure for transmitting and receiving wireless or wired signals. One or multiple transceivers 202 may be used in the ED 110. One or multiple antennas 204 may be used in the ED 110. Although shown as a single functional unit, a transceiver 202 may also be implemented using at least one transmitter and at least one separate receiver. The transceiver 202 may include a monostatic sensing node configured to provide integrated communication and sensing as described herein.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 may store software instructions or modules configured to implement some or all of the functionality described herein and that are executed by the processing unit 200. Software instructions refer to computer- or processor-readable instructions that can be executed by a computer or processor, such as the processing unit 200. Each memory 208 may include any suitable volatile or non-volatile storage and retrieval device(s). Any suitable type of memory may be used. Possible memories for selection include random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver (not shown) may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, bit scrambling, data processing, power control, input/output processing, or any other functionality. The processing unit 250 can also be configured to implement some or all of the functionality described herein. Each processing unit 250 includes any suitable processing or computing device configured to perform one or more operations. Each processing unit 250 may, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 may be combined into a transceiver. Each antenna 256 includes any suitable structure for transmitting and receiving wireless or wired signals. Although a common antenna 256 is shown here as being coupled to both the transmitter 252 and the receiver 254, one or more antennas 256 may be coupled to the transmitter(s) 252, and one or more separate antennas 256 may be coupled to the receiver(s) 254, respectively. Each memory 258 may include any suitable volatile or non-volatile storage and retrieval device(s), such as those described above in connection to the ED 110. The memory 258 stores instructions and data used, generated, or collected by the base station 170. For example, the memory 258 may store software instructions or modules configured to implement some or all of the functionality described herein and that are executed by the processing unit(s) 250.

Each input/output device 266 permits interaction with a user or other devices in the network. Each input/output device 266 includes any suitable structure for providing information to or receiving/providing information from a user, including network interface communications.

Further, according to some embodiments of the present disclosure, one or more of ED 110 and BS 170 may each include a sensing node such as a radar configured for performing sensing, or integrated communication and sensing. For example, the transceiver 202 of ED 110 may be, or include a monostatic sensing node configured to operate in the HDX mode for transmitting and receiving pulsed radio frequency (RF) signals. The BS 170 may also include the sensing node as, or in, the transmitter 252 or receiver 254, or may have an integrated transceiver (not shown in FIG. 2B) that includes the sensing node configured to operate in the monostatic HDX mode for transmitting and receiving pulsed RF signals.

Additional details regarding the EDs 110 and the BS 170 are known to those of skill in the art. As such, these details are omitted here for clarity.

As shown in FIG. 2C, the sensing agent 122 includes at least one processing unit 220, at least one transmitter 222, at least one receiver 224, one or more antennas 226, at least one memory 228, and one or more input/output devices or interfaces 230. A transceiver, not shown, may be used instead of the transmitter 222 and receiver 224. The processing unit 220 implements various processing operations of the sensing agent 122, such as signal coding, bit scrambling, data processing, power control, input/output processing, or any other functionality. The processing unit 220 can also be configured to implement some or all of the functionality described herein. Each processing unit 220 may include any suitable processing or computing device configured to perform one or more operations. Each processing unit 220 may, for example, include a microprocessor, microcontroller, digital signal processor, field programmable gate array, or application specific integrated circuit, or any combination thereof.

Each transmitter 222 includes a suitable structure for generating sensing signals for wireless transmission. Each receiver 224 includes a suitable structure for processing sensing signals received wirelessly. Although shown as separate components, at least one transmitter 222 and at least one receiver 224 may be combined into a transceiver. In some embodiments, a sensing agent may only transmit or receive sensing signals, such as for bi-static sensing. In some embodiments, a sensing agent only transmits sensing signals, and the reflections of these sensing signals may be received by other sensing nodes. In some embodiments, a sensing agent receives reflections of sensing signals, but does not transmit sensing signals. Therefore, some sensing agents might only include one of a transmitter and a receiver. As such, for the sensing agent 122, the at least one transmitter 222 or the at least one receiver 224 may be optional.

Each antenna 226 includes any suitable structure for transmitting or receiving wired or wireless signals. Although a common antenna 226 is shown here as being coupled to both the transmitter 222 and the receiver 224, one or more antennas 226 may be coupled to the transmitter 222, and one or more separate antennas 226 may be coupled to the receiver 224.

Each memory 228 may include any suitable volatile or non-volatile storage and retrieval device(s), such as those described above in connection to the ED 110. The memory 228 stores instructions and data used, generated, or collected by the sensing agent 122. For example, the memory 228 may store software instructions or modules configured to implement some or all of the functionality described herein and that are executed by the processing unit 220. Each input/output device 230 permits interaction with a user or other devices in the network.

Figure 3A:
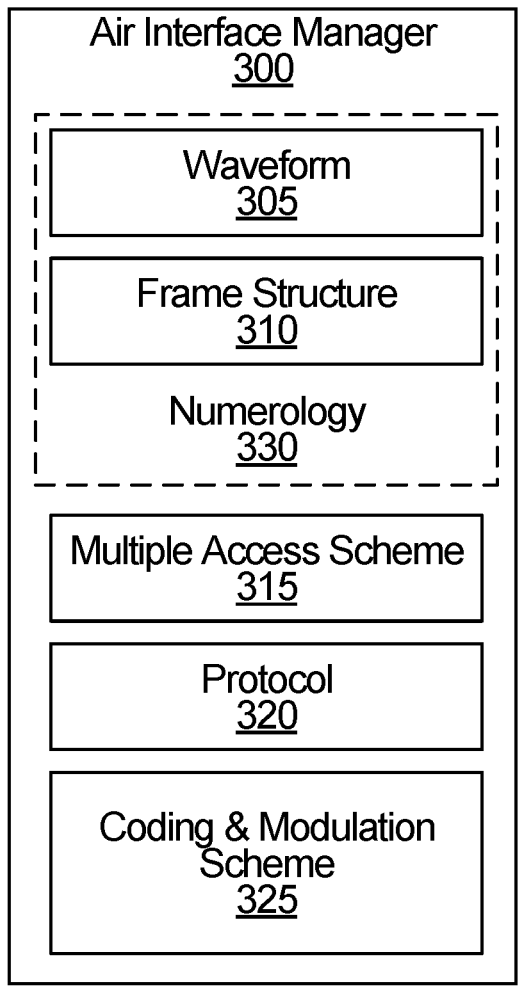
FIG. 3A is a block diagram of an air interface manager for configuring a software-configurable air interface according to an aspect of the present disclosure.

FIG. 3A illustrates a schematic diagram of an air interface manager 300 for configuring a software-configurable air interface 190. Air interface manager 300 may be, for example, a module comprising a number of components or building blocks that define the parameters of the air interface 190 and collectively specify how a transmission is to be made or received by the air interface 190. The air interface manager 300 may also, or instead, define the parameters of sensing signals in the communication system 100.

The air interface manager 300 is configured to manage and adjust the signal or operation parameters of the integrated sensing and communications system. These parameters can include: signal bandwidth, signal waveform, frame structure, or numerology, based on selected input parameters related to sensing and/or communications performance. Such input parameters include: the desired or required sensing resolution, distance range of sensing, communications throughput, transmission PAPR, velocity resolution of objects, communications reliability, network traffic (in terms of the number of users), available bandwidth for communications and/or sensing, frequency band, or the like.

Air interface manager 300 may be specifically adapted to configure a communication and sensing signal according to an embodiment disclosed herein. For example, the communication and sensing signal may be configured to implement a waveform, frame structure, numerology, or any other features described above and below, individually or in combination. Air interface manager 300 may also manage various aspects of control signaling, multiplexing of the sensing and communication signals, or provide other coding and modulation scheme functions described elsewhere herein. A communication and sensing signal refers to one or more signals or waveforms configured and structured for both communication and sensing purposes. For monostatic sensing in the HDX communication mode, the communication and sensing signal is a pulse signal, and may be structured and configured as described herein to facilitate integrated communication and sensing. A communication and sensing signal may be a sensing signal that is also configured and used for communication of data or information.

However, in some embodiments, the signal design and signal structures and features disclosed herein may also be used in a sensing signal that is only used for sensing, or by a sensing device or node that performs sensing functions without performing communications functions at the same time. In such cases, implementing one or more features disclosed herein in the sensing signal or the sensing device or node may still be beneficial. For example, it may allow different devices (e.g., sensing-specific and communication-specific devices) and nodes to work more efficiently together and reduce unwanted interferences.

Specifically, the components of the air interface manager 300 include at least one of a waveform component 305, a frame structure component 310, a numerology component 330, a multiple access scheme component 315, a protocol component 320, and a coding and modulation scheme component 325. The air interface manager 300 may also include a scheduling component, a power allocation component, or a beamforming component (not shown), to perform scheduling, power allocation, or beamforming functions respectively, as described elsewhere herein. One of more of these functions can also be performed by an integrated component.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF). In some embodiments, a combination of waveform options is possible. A LFM-OFDM waveform is a non-limiting example of such a combination.

Example waveform configurations suitable for integrated communication and sensing according to embodiments of the present disclosure will be further discussed below.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, duration of each symbol, the number of time slots in the frame and the duration of each time slot (sometimes known as a transmission time interval, TTI, or a transmission time unit, TTU). The frame structure component 310 may also specify whether the time slot is a configurable multi-level TTI, a fixed TTI, or a configurable single-level TTI. The frame structure component 310 may further specify a co-existence mechanism for different frame structure configurations.

For some waveforms, such as certain OFDM-based waveforms, the frame structure component 310 may also specify one or more associated waveform parameters, such as symbol duration, cyclic prefix (CP) length, channel bandwidth, guard time, and sampling size and frequency.

Additionally, the frame structure component 310 may further specify whether the frame structure is used in a time-division duplex (TDD) communication or a frequency-division duplex (FDD) communication.

Additionally, the frame structure component 310 may further specify the transmission state or direction, or both, for each symbol in a frame. For example, each symbol may independently be configured as a downlink (DL) symbol, an uplink (UL) symbol, a sidelink (SL) symbol, a flexible symbol, or a sensing symbol. A sensing signal may be transmitted or received in a sensing symbol. The frame structure component 310 may also include configuration of the time guard between different symbol types, for example, between DL and UL symbols and the like.

Figure 3B:
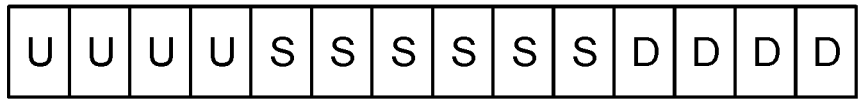
FIGS. 3B, 3C, 3D, 3E, 3F and 3G are schematic diagrams illustrating example transmission frames according to aspects of the present disclosure.

An example is shown in FIG. 3B, which illustrates a transmission frame 350 that includes uplink (U), sensing (S), and downlink (D) symbols.

Figure 3C:

The sensing symbols may be configured to have a different numerology, as compared with the numerology of the uplink and downlink symbols. For example, the sensing symbols can be configured to have a shorter length than the uplink/downlink symbols, as illustrated in FIG. 3C, where a transmission frame 360 includes uplink (U), sensing (S) and downlink (D) symbols that have different symbol lengths. In particular, the sensing symbols in the transmission frame 360 are configured to have a shorter length than the sensing symbols in the transmission frame 350.

Example frame structure configurations suitable for integrated communication and sensing according to embodiments of the present disclosure will be discussed below.

The specifications of the waveform component and the frame structure component are sometimes referred to as the "numerology" of the signal.

As depicted in FIG. 3A, the air interface 190 may also include the numerology component 330 defining a number of air interface configuration parameters, such as the subcarrier spacing, CP length, symbol length, guard band/subcarriers, or the like.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a TDD context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing maybe compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacing are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band of the carrier. For example, the subcarrier spacing in millimeter wave carrier frequencies may be higher than in lower carrier frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The above mentioned parameters for OFDM frame structure and numerology can also be applied to other multi-carrier waveforms including filter bank multi-carrier (FBMC) waveform, offset quadrature amplitude modulation OQAM waveform, CP-OQAM, or the like.

For single-carrier waveforms, each symbol may include one or more narrow pulses. The number of pulses per symbol, parameters of pulse shape, and pulse overlap factor may also be included in the frame structure parameters to be configured.

The use of different numerologies can allow the air interface 190 to support coexistence of a diverse set of use cases having a wide range of quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Space Division Multiple Access (SDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access, non-orthogonal multiple access, orthogonal multiple access, e.g., via a dedicated channel resource (i.e., no sharing between multiple EDs), contention-based shared channel resource, non-contention-based shared channel resource, and cognitive radio-based access.

The protocol component 320 may specify how a transmission including re-transmission is to be made. Non-limiting examples of transmission mechanism options include options that specify a scheduled data pipe size and a signaling mechanism for transmission. This may also include the signaling related to higher layers and the content from the higher layers.

The protocol component 320 may be configured to implement some of the data scheduling and signaling features discussed elsewhere in this disclosure.

The coding and modulation scheme component 325 may specify how information being transmitted may be encoded/decoded and modulated/demodulated for transmission/reception purposes. Coding may refer to methods of forward error correction. Non-limiting examples of coding options include turbo codes, turbo trellis codes, turbo product codes, fountain codes, low-density parity check (LDPC) codes, and polar codes. Modulation may refer, simply, to Quadrature Amplitude Modulation (QAM) specified by a complex constellation (including, for example, the modulation technique and order, e.g. 16QAM, 64QAM, etc.), or more specifically to various types of advanced modulation methods such as hierarchical modulation, multi-dimensional modulation and low Peak-to-Average Power Ratio (PAPR) modulation including π/2-Binary Phase Shift Keying (BPSK) modulation and π/4-Quadrature Phase Shift Keying (QPSK) modulation, or the like.

The coding and modulation scheme component 325 may be specifically configured to implement a coding or modulation scheme to adjust the parameters of modulation and coding of the transmitted communication/sensing signal (e.g. code rate and modulation type and order) as described elsewhere in this disclosure to facilitate integrated communication and sensing.

Because an air interface comprises a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310, with a single numerology component 330. Conversely, the air interface manager 300 may separate the coding and modulation scheme component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

FIG. 4A is a diagram illustrating an example communication system 400 implementing integrated communication and sensing in a HDX mode using monostatic sensing nodes. The communication system 400 includes multiple transmission and receive points (TRPs) 402, 404, 406, and multiple UEs 410, 412, 414, 416, 418, 420. In FIG. 4A, for illustration purposes only, the UEs 410, 412 are illustrated as vehicles and the UEs 414, 416, 418, 420 are illustrated as cell phones, however, these are only examples and other types of UEs may be included in System 400.

The TRP 402 is a base station that transmits a downlink (DL) signal 430 to the UE 416. The DL signal 430 is an example of a communication signal carrying data. The TRP 402 also transmits a sensing signal 464 in the direction of the UEs 418, 420. Therefore, the TRP 402 is involved in sensing and is considered to be both a sensing node (SeN) and a communication node.

The TRP 404 is a base station that receives an uplink (UL) signal 440 from the UE 414, and transmits a sensing signal 460 in the direction of the UE 410. The UL signal 440 is an example of a communication signal carrying data. Since the TRP 404 is involved in sensing, this TRP is considered to be both a sensing node (SeN) and a communication node.

The TRP 406 transmits a sensing signal 466 in the direction of the UE 420, and therefore this TRP is considered to be a sensing node. The TRP 406 may or may not transmit or receive communication signals in the communications system 400. In some embodiments, the TRP 406 may be replaced with a sensing agent (SA) that is dedicated to sensing, and does not transmit or receive any communication signals in the communication system 400.

The UEs 410, 412, 414, 416, 418, 420 are all capable of transmitting and receiving communication signals on at least one of UL, DL, and SL. For example, the UEs 418, 420 are communicating with each other via SL signals 450. At least some of the UEs 410, 412, 414, 416, 418, 420 are also sensing nodes in the communication system 400. By way of example, the UE 412 may transmit a sensing signal 462 in the direction of the UE 410 during an active phase of operation. The sensing signal 462 may include or carry communication data, such as payload data, control data, and signaling data. A reflection signal 463 of the sensing signal 462 is reflected off UE 410 and returned to and sensed by UE 412 during a passive phase of operation. Therefore, the UE 412 is considered to be both a sensing node and a communication node.

A sensing node in the communication system 400 may implement monostatic or bi-static sensing. At least some of the sensing nodes such as UEs 410, 412, 418 and 420 may be configured to operate in the HDX monostatic mode. In some embodiments, all of the sensing nodes in the communication system 400 may be configured to operate in the HDX monostatic mode.

In the case of monostatic sensing, the transmitter of a sensing signal is a transceiver such as a monostatic sensing node transceiver, and also receives a reflection of the sensing signal to determine the properties of one or more objects within its sensing range. In an example, the TRP 404 may receive a reflection 461 of the sensing signal 460 from the UE 410 and potentially determine properties of the UE 410 based on the reflection 461 of the sensing signal. In another example, the UE 412 may receive reflection 463 of the sensing signal 462 and potentially determine properties of the UE 410 based on the sensed reflection 463.

In some embodiments, the communication system 400 or at least some of the entities in the system may operate in a HDX mode. For example, a first one of the EDs in the system, such as the UEs 410, 412, 414, 416, 418, 420 or TRPs 402, 404, 406, may communicate with at least another one (second one) of the EDs in the HDX mode. The transceiver of the first ED may be a monostatic transceiver configured to cyclically alternate between operation in an active phase and operation in a passive phase for a plurality of cycles, each cycle including a plurality of communication and sensing subcycles. During operation, in the active phase of a communication and sensing subcycle, a pulse signal is transmitted from the transceiver. The pulse signal is an RF signal and is used as a sensing signal, but also has a waveform structured to facilitate carrying communication data. In the passive phase of the communication and sensing subcycle, the transceiver of the first ED also senses a reflection of the pulse signal reflected from an object at a distance (d) from the transceiver, for sensing objects within a sensing range. In the passive phase, the first ED may also detect and receive communication signals from the second ED or possibly other EDs. The first ED may use the monostatic transceiver to detect and receive the communication signals. The first ED may also include a separate receiver for receiving the communication signals. However, to avoid possible interference, the separate receiver may also be operated in the HDX mode. In these embodiments, any of the sensing signals 460, 462, 464, 466 and communication signals 430, 440, 450 illustrated in FIG. 4A may be used for both communication and sensing. In these embodiments, the pulse signal may be structured to optimize the duty cycle of the transceiver so as to meet both communication and sensing requirements while maximizing operation performance and efficiency. In a particular embodiment, the pulse signal waveform is configured and structured so that the ratio of the duration of the active phase and the duration of the passive phase in a sensing cycle or subcycle is greater than a predetermined threshold ratio, and at least a predetermined proportion of the reflection reflected from targets within a given range is received by the transceiver.

In an example, the ratio or proportion may be expressed as a time value; accordingly, the pulse signal in this example is configured and structured so that active phase time is a specific value or range of values, and the passive phase time is a specific value or range of values associated with the respective value or values of the active phase time. As a result, the pulse signal is configured such that the time value of the reflection is greater than a threshold value. The ratio or proportion may also be indicated or expressed as a multiple of a known or predefined value or metric. The predefined value may be a predefined symbol time, such as a sensing symbol time, as will be further discussed below.

The durations of the active and passive phases, and the waveform and structures of the pulse signal may also be otherwise configured according to embodiments described herein to improve communication and sensing performance. For example, constraints on the ratio of the phase durations may be provided to balance the competing factors of efficient use of the signal resources for communication and the sensing performance, as discussed above and in further details below.

Figure 4B:
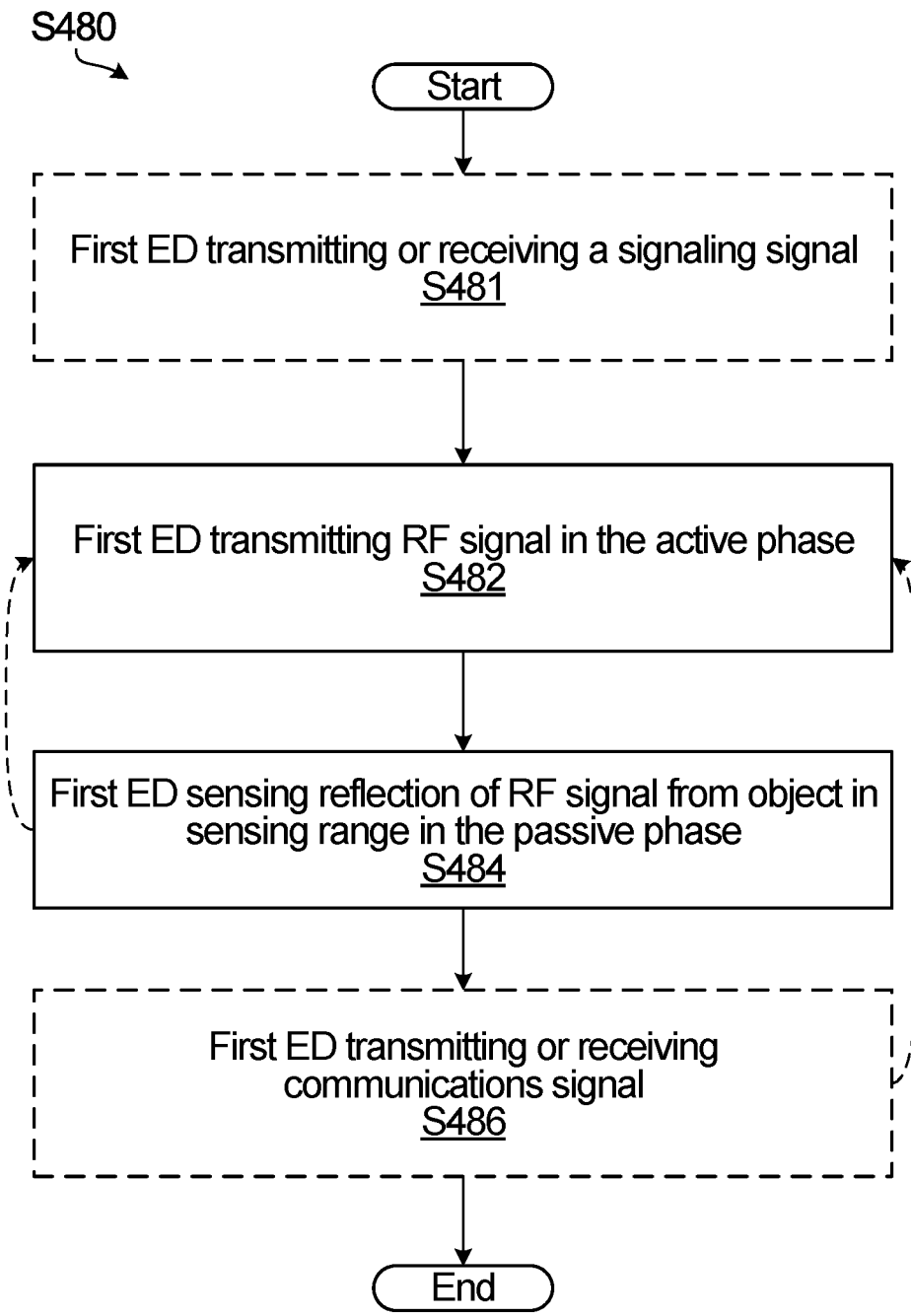
FIG. 4B is a flowchart illustrating an example operation process of an electronic device for integrated sensing and communication, according to an embodiment of the present disclosure.

An example of the operation process at the first ED is illustrated in FIG. 4B, as process S480.

In process S480, the first ED, such as the UE 412, is operated to communicate with at least one second ED, which may be any one or more of BS 402, 404, 406 or UE 410, 414, 416, 418, 420. The first ED is operated to cyclically alternate between an active phase and a passive phase.

In the active phase, at S482, the first ED transmits a radio frequency (RF) signal in the active phase. The RF signal may be a pulse signal suitable as a sensing signal. The pulse signal is beneficially configured to also be suitable for carrying communication data within the pulse signal. For example, the pulse signal may have a waveform structured to carry communication data.

In the passive phase, at S484, the first ED senses a reflection of the RF signal reflected from an object, such as reflection 463 from UE 410.

The active phase and passive phase are alternately and cyclically repeated for a plurality of cycles. Each cycle may include a plurality subcycles. The active and passive phases and the RF signal are configured and structured to receive at least a threshold portion or proportion of the reflected signal during the passive phase when the object is within a sensing range, as will be further described below. As discussed earlier, in some embodiments, the threshold portion or proportion may be indicated or expressed as, or by, a known or predefined value or metric, or a multiple of a base value or reference value. An example metric or value is time, and the base value or metric may be a unit of time or a standard time duration.

In the passive phase, at S484, the first ED may optionally be operated to receive a communication signal from one or more other EDs, which may include UEs or BS.

Optionally, the first ED may be operated to transmit a control signaling signal indicative of one or more signal parameters associated with the RF signal during the active phase at S482.

Optionally, the first ED may be operated to receive a control signaling signal indicative of one or more signal parameters associated with the RF signal to be transmitted by the first ED, or a communication signal to be received by the first ED, during the passive phase. The first ED may process the control signaling signal and construct the RF signal to be transmitted in subsequent cycles.

In an example, the first ED may be operated to transmit or receive a control signaling signal at optional stage S481, separately from the RF signal of S482. The control signaling signal may include information, indications and parameters described elsewhere herein. For example, if the first ED receives a control signaling signal at either S481 or S484, the first ED may configure and structure the signal to be transmitted at S482 based on the information or parameters indicated in the control signaling signal received by the first ED. The control signaling signal may be received from a UE or a BS, or any TP.

If the first ED transmits a control signaling signal, the control signaling signal may include information, indications, and parameters about the signal to be transmitted during the active phase at S482. In this case, the control signaling signal may be transmitted to any other ED, such as a UE or a BS.

Alternatively or furthermore, the RF signal transmitted at S482 may include a control signaling portion. The control signaling portion may indicate one or more of signal frame structure; subcycle index of each subcycle that comprises encoded data; and a waveform, numerology, or pulse shape function, for a signal to be transmitted from the first ED. The signaling portion may include an indication that a cycle or subcycle of the RF signal to be transmitted includes encoded data. The encoded data may be payload data or control data, or include both. For example, the signaling indication may include an indicator of a subcycle index, a frequency resource scheduling index, or a beamforming index, associated with the subcycle or the encoded data.

The process S480 may begin when the first ED starts to sense or communicate with another ED. The process S480 may terminate when the first ED is no longer used for sensing, or when the first ED terminates both sensing and communication operations.

For example, as illustrated in FIG. 4B, in the process S480, the first ED may continue, or start, to transmit or receive communications signals, at S486, after termination of the sensing operations. After a period of communication only operation, the first ED may also resume sensing operations, such as restarting the cyclic operations at S482 and S484.

It is noted that the order of operations at S481, S482, S484, and S486 may be modified and vary from the order shown in FIG. 4B, and operations at S481 and S486 may be performed at the same time or integrated with operations at S482 or S484.

The signal sensed or received during an earlier passive phase may be used to configure and structure a signal to be transmitted in a later active phase, or for scheduling and receiving a communication signal in later passive phase. The received communication signal may be a sensing signal transmitted by another ED that also embeds or carries communication data, including payload data or control data.

Each of the first ED and second ED(s) may be a UE or a BS.

The signal received or transmitted by the first ED may include control signaling that provides information about the parameters or structure details of the signal to be transmitted by the first ED, or of a signal to be received by the first ED.

The control signaling may include information about embedding communication data in a sensing signal such as the RF signal transmitted by the first ED.

The control signaling may include information about multiplexing a communication signal and a sensing signal for DL, UL, or SL.

In the case of bi-static sensing, the receiver of a reflected sensing signal is different from the transmitter of the sensing signal. In some embodiments, a BS, TRP or UE may also be capable of operating in a bi-static or multi-static mode, such as at selected times or in communication with certain selected EDs that are also capable of operating in the bi-static or multi-static mode. For example, any or all of the UEs 410, 412, 414, 416, 418, 420 may be involved in sensing by receiving reflections of the sensing signals 460, 462, 464, 466. Similarly, any or all of the TRPs 402, 404, 406 may receive reflections of the sensing signals 460, 462, 464, 466. While embodiments of this disclosure are primarily directed to problems in monostatic sensing, the embodiments can also be beneficial for bi-static or multi-static sensing, particularly to facilitate compatibility and reduce interference when used in a system with both monostatic and multi-static nodes.

In an example, the sensing signal 464 may be reflected off of the UE 420 and be received by the TRP 406. It should be noted that a sensing signal might not physically reflect off of a UE, but may instead reflect off an object that is associated with the UE. For example, the sensing signal 464 may reflect off of a user or vehicle that is carrying the UE 420. The TRP 406 may determine certain properties of the UE 420 based on a reflection of the sensing signal 464, including the range, location, shape, and speed or velocity of the UE 420, for example. In some implementations, the TRP 406 may transmit information pertaining to the reflection of the sensing signal 464 to the TRP 402, or to any other network entity. The information pertaining to the reflection of the sensing signal 464 may include the time that the reflection was received, the time-of-flight of the sensing signal (for example, if the TRP 406 knows when the sensing signal was transmitted), the carrier frequency of the reflected sensing signal, the angle of arrival of the reflected sensing signal, and the Doppler shift of the sensing signal (for example, if the TRP 406 knows the original carrier frequency of the sensing signal). Other types of information pertaining to the reflection of a sensing signal are also contemplated.

The TRP 402 may determine properties of the UE 420 based on the received information pertaining to the reflection of the sensing signal 464. If the TRP 406 has determined certain properties of the UE 420 based on the reflection of the sensing signal 464, such as the location of the UE 420, then the information pertaining to the reflection of the sensing signal 464 may also or instead include these properties.

In another example, the sensing signal 462 may be reflected off of the UE 410 and be received by the TRP 404. Similar to the example provided above, the TRP 404 may determine properties of the UE 410 based on the reflection 463 of the sensing signal 462, and transmit information pertaining to the reflection of the sensing signal to another network entity, such as the UEs 410, 412.

In a further example, the sensing signal 466 may be reflected off of the UE 420 and be received by the UE 418. The UE 418 may determine properties of the UE 420 based on the reflection of the sensing signal, and transmit information pertaining to the reflection of the sensing signal to another network entity, such as the UE 420 or the TRPs 402, 406.

The sensing signals 460, 462, 464, 466 are transmitted along particular directions, and in general, a sensing node may transmit multiple sensing signals in multiple different directions. In some implementations, sensing signals are used to sense the environment over a given area, and beam sweeping is one of the possible techniques to expand the covered sensing area. Beam sweeping can be performed using analog beamforming to form a beam along a desired direction using phase shifters, for example. Digital beamforming and hybrid beamforming are also possible. During beam sweeping, a sensing node may transmit multiple sensing signals according to a beam sweeping pattern, where each sensing signal is beamformed in a particular direction.

The UEs 410, 412, 414, 416, 418, 420 are examples of objects in the communication system 400, any or all of which could be detected and measured using a sensing signal. However, other types of objects could also be detected and measured using sensing signals. Although not illustrated in FIG. 4A, the environment surrounding the communication system 400 may include one or more scattering objects that reflect sensing signals and potentially obstruct communication signals. For example, trees and buildings could at least partially block the path from the TRP 402 to the UE 420, and potentially impede communications between the TRP 402 and the UE 420. The properties of these trees and buildings may be determined based on a reflection of the sensing signal 464, for example.

In some embodiments, communication signals are configured based on the determined properties of one or more objects. The configuration of a communication signal may include the configuration of a numerology, waveform, frame structure, multiple access scheme, protocol, beamforming direction, coding scheme, or modulation scheme, or any combination thereof. Any or all of the communication signals 430, 440, 450 may be configured based on the properties of the UEs 414, 416, 418, 420. In one example, the location and velocity of the UE 416 may be used to help determine a suitable configuration for the DL signal 430. The properties of any scattering objects between the UE 416 and the TRP 402 may also be used to help determine a suitable configuration for the DL signal 430. Beamforming may be used to direct the DL signal 430 towards the UE 416 and to avoid any scattering objects. In another example, the location and velocity of the UE 414 may be used to help determine a suitable configuration for the UL signal 440. The properties of any scattering objects between the UE 414 and the TRP 404 may also be used to help determine a suitable configuration for the UL signal 440. Beamforming may be used to direct the UL signal 440 towards the TRP 404 and to avoid any scattering objects. In a further example, the location and velocity of the UEs 418, 420 may be used to help determine a suitable configuration for the SL signals 450. The properties of any scattering objects between the UEs 418, 420 may also be used to help determine a suitable configuration for the SL signals 450. Beamforming may be used to direct the SL signals 450 to either or both of the UEs 418, 420 and to avoid any scattering objects.

The properties of the UEs 410, 412, 414, 416, 418, 420 may also or instead be used for purposes other than communications. For example, the location and velocity of the UEs 410, 412 may be used for the purpose of autonomous driving, or for simply locating a target object.

The transmission of sensing signals 460, 462, 464, 466 and communication signals 430, 440, 450 may potentially result in interference in the communication system 400, which can be detrimental to both communication and sensing operations.

Some aspects of the present disclosure relate to sensing signal configurations that enable the coexistence or integration of sensing signals and communication signals in a communication network. Such coexistence can be achieved using sensing signal configurations that can at least partially avoid interference among communication and sensing signals.

Some aspects of the present disclosure also relate to integrated sensing and communication signals, where the same signal is used for both sensing and communication. In this case, the signal configuration is designed according to some embodiments herein to effectively and efficiently provide the dual functionality of sensing and communication.

In some embodiments, a sensing node determines a sensing signal configuration or sensing signal configuration information, and then transmits a sensing signal according to the sensing signal configuration. Non-limiting examples of determining a sensing signal configuration include receiving at least a portion of the sensing signal configuration from another network entity, and generating at least a portion of the sensing signal configuration based on one or more predetermined properties.

Sensing signals can be in-band or out-of-band. For in-band sensing, sensing signals and communication signals are transmitted using the same set of physical resources. For example, a network entity may transmit communication signals and sensing signals over the same frequency band simultaneously or at different times. For out-of-band sensing, sensing signals are transmitted using a set of physical resources that is different from the set of physical resources used for communication signals. In some embodiments, the set of physical resources is dedicated to sensing.

Sensing signal configurations can be target-specific or sensing node-specific.

For target-specific configuration, the sensing signal is configured for a particular target. The targets may include UEs and scattering objects. In some implementations, target-specific sensing signals improve the sensing performance for particular targets. Target-specific parameters may be obtained by a sensing node through measurement, training, or based on some desired performance indicator. Example desired performance indicators may include target classification results and desired sensing quality. Performance indicators may include, for example, an indicator of the mobility of the target.

For sensing-node specific configuration, the sensing signal is configured for a particular sensing node. In some implementations, sensing node-specific sensing signals can improve the sensing performance of the specific sensing nodes. For example, a sensing node-specific sensing signal configuration can be based on the properties and requirements of the sensing node that will transmit and receive the sensing signal. Possible benefits of providing target-specific and sensing node-specific sensing signal configurations include the flexibility to adjust the configuration of a sensing signal based on a desired sensing quality, and to reduce interference between sensing signals from different sensing nodes. Target-specific and sensing node-specific configurations can be applied to both in-band sensing and out-of-band sensing.

Some sensing node-specific sensing signal configurations may be based on, and possibly include, unique identifiers that are specific to the transmitter of the sensing signal. The unique identifiers can allow the transmitter of a sensing signal to be determined by other network entities that receive the sensing signal. For this purpose, a sensing node in a network may be assigned a sensing node identifier (ID). The sensing node ID may be a unique identifier that is specific to the transmitter of a sensing signal. The sensing node ID may be the same as, or be associated with, another network ID such as a cell ID or UE ID. Alternatively, the sensing node ID may be different from other network IDs and be configured independently. In some implementations, the sensing node ID may be configured or assigned by the network, and may be communicated to a sensing node, such as through higher-layer signaling, such as radio resource control (RRC) signaling or medium access control (MAC) control element (CE) signaling (MAC-CE), for example. In some implementations, a sensing node may determine its sensing node ID based on another network ID assigned to the sensing node. The sensing node may also determine the sensing node IDs of other sensing nodes in the network based on their assigned network IDs. Sensing signal configurations for a particular sensing node can be based on, or mapped to, the sensing node ID that is associated with that sensing node.

Parameters that can be included in a sensing signal configuration will now be discussed in detail. However, these parameters are provided by way of example only, and are not intended to be limiting. In general, a sensing signal configuration can include any set of parameters.

In some embodiments, a sensing signal configuration includes a waveform configuration. Depending on the type of waveform used for a sensing signal, several possible parameters may be set in order to improve the performance of the sensing signal in a communication network. For example, a numerology for the sensing signal configuration may be set based on the type of waveform that is configured. Improving the performance of a sensing signal may include improving the range resolution and velocity resolution of the sensing signal, and reducing interference with communication signals or other sensing signals.

Using a waveform that is compatible with both communications and sensing operations may improve the performance of both operations, and reduce complexity for some sensing nodes. For example, the same receivers may be used for receiving sensing signals and for receiving communication signals. In addition, using a waveform that is compatible with both communications and sensing operations enables joint detection and processing of sensing and communication signals to improve the detection of both. Sensing signals and communication signals may also use the same frame structure or numerology (for example, subcarrier spacing, cyclic prefix (CP) length, etc.), which may also improve performance and reduce complexity.

Orthogonal frequency division multiplexing (OFDM) waveforms may be used for sensing signals, and can achieve suitable sensing performance in some implementations. Radar sensing using OFDM waveforms has been investigated in the following studies: Braun, M., Sturm, C., Jondral, F. K. "*Maximum likelihood speed and distance esti-* mation for OFDM radar". Proc. 2010 IEEE Radar Conf., Washington, D.C., May 2010, pp. 256-261; Braun, M., Sturm, C., Niethammer, A., Jondral, F. "Parameterization of joint OFDM-based radar and communication systems for vehicular Applications". Proc. 20th IEEE Int. Symp. Personal, Indoor, Mobile Radio Communications, Tokyo, Japan, September 2009, pp. 3020-3024; Donnet, B. J., Longstaff, I.D. "Combining MIMO radar with OFDM communications". Proc. Third European Radar Conf., Manchester U.K., September 2006, pp. 37-40; Yang Yang and R. S. Blum, "MIMO radar waveform design based on mutual information and minimum mean-square error estimation", Aerospace and Electronic Systems, IEEE Transactions on, vol. 43, no. 1, pp. 330-343, January 2007; and C. Sturm and W. Wiesbeck, "Waveform Design and Signal Processing Aspects for Fusion of Wireless Communications and Radar Sensing", Proceedings of the IEEE, Volume: 99, Issue: 7, July 2011, pp. 1236-1259.

OFDM may be a suitable choice of waveform for in-band sensing or out-of-band sensing. In some embodiments, OFDM waveforms are used for communication signals and for sensing signals to allow for the joint detection and processing of sensing signals and communication signals. The numerologies of the OFDM waveforms for the communication signals and sensing signals may be the same or different.

In some embodiments, the numerology of an OFDM waveform may be selected to improve sensing performance and reduce interference between different sensing signals. Considering a sensing signal configuration with a cyclic prefix OFDM (CP-OFDM) waveform as an example, sub-carrier spacing, CP length/overhead, and sensing slot length (for example, the number of symbols included in each sensing cycle as well as the configuration of sensing symbols in the sensing cycle, e.g. contiguous symbols or distributed symbols) are parameters that may be set to possibly improve the performance of sensing. In the case of frequency modulated continuous wave waveform, in addition to the above parameters, frequency sweeping range may also be set to possibly improve the performance of sensing.

In some embodiments, the selected waveform to transmit communications and sensing signal is single-carrier. In this case, the parameters of the sensing signal may be selected to improve sensing performance and reduce interference between different sensing signals. In single-carrier waveform, parameters like number of pulses in a symbol, sensing slot length (for example, the number of symbols included in each sensing cycle as well as the configuration of sensing symbols in the sensing cycle, e.g. contiguous symbols or distributed symbols), pulse shape parameters, and pulse overlapping factor are parameters that may be set to possibly improve the performance of sensing. Some or all of these parameters may also apply to ultra-wide band waveform.

It should be noted that the present disclosure is not limited to any particular types or configurations of waveforms for sensing signals or communication signals. For example, a waveform configuration for a sensing signal may be single-carrier (where spreading sequences may be used for interference mitigation), multi-carrier, ultra-wide band, or frequency modulated continuous wave. In some embodiments, a waveform configuration can be target-specific or sensing node-specific.

In some embodiments, a sensing signal configuration includes a symbol sequence. Symbol sequence is a vector of complex values used for baseband representation of the sensing signal in order to optimize the sensing performance, transmit efficiency (including PAPR) and reducing interference to other sensing signals or communications signals. An example of such symbol sequences is Zadoff Chu (ZC) sequences. As a sensing signal does not carry any data, the symbol sequence may be configured to distinguish sensing signals sent by different sensing nodes or to mitigate interference. In some embodiments, a symbol sequence for a sensing signal configuration is sensing node-specific and is based on a sensing node ID for that sensing node. A symbol sequence for a sensing signal configuration may also or instead be target-specific.

In some embodiments, the symbol sequence may be configured to optimize the sensing performance. For example, sequences with good autocorrelation properties can be used to achieve improved range resolution.

In some embodiments, sensing signals are configured to reduce cross-correlation between different symbol sequences sent on the same resources. As the length of a symbol sequence increases, the number of degrees of freedom for the symbol sequence and the potential number of orthogonal symbol sequences become larger. A set or pool of potential symbol sequences may be generated for sensing signals in the network. Once the symbol sequence pool is generated, a symbol sequence for a particular sensing signal configuration can be generated or configured using a seed that is mapped to the sensing node ID of the associated sensing node. For example, if the symbol sequence is a Zadoff-Chu (ZC) sequence, the seed value can be the root or phase shift value of the ZC sequence. In another example, if the symbol sequence is a binary Pseudo Noise (PN) sequence, the seed value can be associated with the generating polynomial or the degree for a given sequence type.

In some embodiments, a symbol sequence for a sensing signal is based on, and possibly specific to, a predetermined beam direction for that sensing signal. As such, different symbol sequences can be used for different beam directions. A sensing node may perform beam sweeping to cover a given area, and each of the sensing signals transmitted by the sensing node during beam sweeping can be dependent on the beam direction. In some embodiments, certain directions that are more predictable may need less accurate sensing (for example, there are fixed objects in these directions and less change in the environment), and therefore shorter symbol sequences may be implemented. Other directions may be less predictable, and therefore longer symbol sequences may be used for these directions.

Depending on the power capability of a sensing node and the waveform used, relatively low peak-to-average power ratios (PAPRs) for sensing signals may be desired. Therefore, in some embodiments, symbol sequences are configured for a relatively low PAPR. Low PAPR sequences may include ZC sequences, similar to those that have been used in demodulation reference signal (DMRS) designs. Low PAPR sequences may also or instead be found by a computer search. Low PAPR sequences that are used in conjunction with appropriate resource mapping can result in low PAPR sensing signal transmission.

A symbol sequence for a sensing signal configuration may depend on whether the sensing signal is in-band or out-of-band. There may be more flexibility in the configuration of symbol sequences with out-of-band sensing; whereas, with in-band the sensing, the sensing signals are multiplexed with data, and the configuration of symbol sequences may be more limited. In some embodiments, the configuration of sensing signal symbol sequences is based on techniques used for configuring other types of reference signals including channel state information reference signals (CSI-RSs), DMRSs, and positioning reference signals (PRSs), for example.

Although out-of-band sensing does not involve multiplexing sensing signals with data, and is consequently more flexible to configure, out-of-band sensing can still benefit from the various embodiments of the present disclosure, for example by reducing interference between the sensing signal and data communication bands.

In some embodiments, a sensing signal configuration includes a resource configuration, a resource allocation or a resource mapping configuration. A resource configuration for a sensing signal is selected from a set of physical resources associated with the wireless communication network. As noted above, for in-band sensing these physical resources are also used for the transmission of communication signals, and for out-of-band sensing these physical resources are different from the resources used for communication signals.

Physical resources for sensing signals can be configured in a sparse way. For example, a resource configuration may include a sparsity pattern in at least one of the frequency domain and the time domain. This sparsity pattern may be similar to those used for channel estimation, for example. In some implementations, the sparsity pattern may result in negligible performance loss compared to a full pattern. Potential benefits of sparsity patterns include allowing for multiplexing of sensing signals and communication signals, efficient detection of multiple sensing signals simultaneously, and more efficient joint detection of sensing signals and communication signals. In some implementations, the configuration of a sparsity pattern for a sensing signal is similar to the configuration of a sparsity pattern in non-orthogonal multiple-access (NoMA). Further details regarding the performance of sparsity patterns for sensing signals can be found in C. Knill, B. Schweizer, S. Sparrer, F. Roos, Robert F. H. Fischer, and C. Waldschmidt, *"High Range and Doppler Resolution by Application of Compressed Sensing Using Low Baseband Bandwidth OFDM Radar"*, IEEE TRANSACTIONS ON MICROWAVE THEORY AND TECHNIQUES, VOL. 66, NO. 7, July 2018, pp. 3535-3546.

In some embodiments, the cycle length and the lengths of the active phase and passive phase may be fixed or remain constant over all subcycles of the same sensing cycle. In this case, the signal is characterized or can be defined using parameters that define the duration of the active ("ON") and passive ("OFF") phases. These parameters may be determined based on the characteristics of the environment, as will be explained next.

Figure 5:
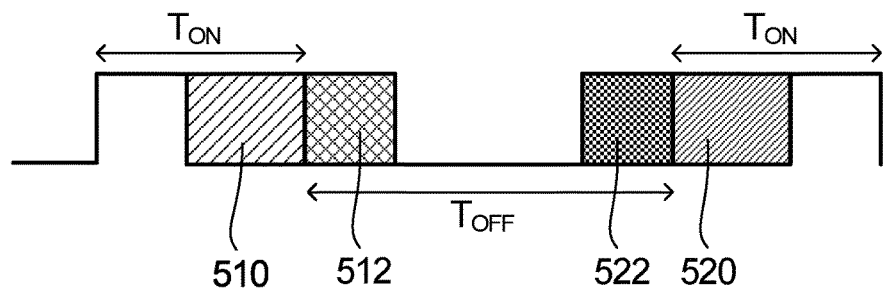
FIG. 5 is a schematic diagram illustrating a signal structure with a fixed cycle length according to an example embodiment of the present disclosure.

An example signal configuration and structure with a fixed cycle length is illustrated in FIG. 5. As depicted in FIG. 5, "$T_{on}$" represents the duration of the active phase, i.e., $T_{on}=t_a$, and "$T_{off}$" represents the duration of the passive phase, i.e., $T_{off}=t_p$.

Normally, for a certain region of interest, the statistics of the target locations (location map) is available and therefore, one can determine the expected target ranges, as being a distance between a minimum sensing range $d_{min}$ and a maximum sensing range $d_{max}$.

For a given ratio of $$r = \frac{d_{max}}{d_{min}}$$

and $\alpha$, the relationship between $t_a$ and $t_p$ is $$t_a \leq \frac{2d_{min}}{c.\alpha},$$

$$t_p + (1-\alpha)t_a \geq \frac{2d_{max}}{c},$$

where c denotes the speed of light. It follows that $$\frac{t_p}{t_a} \geq \alpha\left(r - \frac{1-\alpha}{\alpha}\right) = [\alpha r - (1-\alpha)].$$

As discussed earlier, $\alpha$ is the acceptable minimum proportion of the reflected signal that is still sufficient to provide the needed information to meet the desired or minimum sensing performance requirements.

The above relationship may be understood by reference to FIG. 5. In particular, the shaded time window section 510 in FIG. 5 indicates the time window in which a reflection of transmitted signal reflected off a target object at the distance $d_{min}$ may be possibly returned to the sensing node (without any deflection). As can be understood, the length of the reflection window section 510 is the same as the length of the active phase ($T_{on}$). The reflection window 510 has a portion 512 falling in the passive phase ($T_{off}$). The portion 512 represents the smallest portion of the reflection signals that will be received from targets in the sensing range where a leading portion of the reflection will fall within the active phase and be missed. Therefore, the portion 512 should at least be equal to $\alpha T_{on}$. The leading edge of section 510 is delayed from the leading edge of the active phase ($T_{on}$) by the same time period as portion 512, i.e., at least equal to $\alpha T_{on}$. The shaded time window section 520 in FIG. 5 indicates the time window in which a reflection of transmitted signal reflected off a target object at the distance $d_{max}$ may be possibly returned to the sensing node (without any deflection). The length of reflection 520 is also the same as the length of the active phase ($T_{on}$). The reflection 520 has a portion 522 falling in the passive phase ($T_{off}$). The portion 522 represents the smallest portion of the reflection signals that will be received from targets in the sensing range where a trailing portion of the reflections will fall within the next active phase and be missed. Therefore, the portion 522 should also at least be equal to $\alpha T_{on}$. The leading edge of section 520 is thus ahead of the trailing edge of the passive phase by the same time period as portion 522, or at least equal to $\alpha T_{on}$, and delayed from the leading edge of the active phase by at least $T_{on}+T_{off}-\alpha T_{on}=(1-\alpha)T_{on}+T_{off}$. Reflections 510 and 520 thus represent two worst case scenarios where the missing reflection portion is the maximum missed portion for all reflections from targets in the sensing range, or in other words, the received reflection portion is at the minimum.

Thus, to ensure at least the $\alpha$ proportion of any transmitted signal in a subcycle can be sensed when it is reflected from a target within the given range d, $d_{min} \leq d \leq d_{max}$, the passive phase ($T_{off}$) must be long enough to cover both the trailing a proportion 512 of section 510 and the leading a proportion 522 of section 520.

For given $d_{min}$, the least time it takes for the sensing signal to travel from the sensing node to a target in the range and for the reflection to travel back from the target to the sensing node is $2d_{min}/c$. For given $d_{min}$ and $\alpha<1$, in order for the reflection to be received in the immediate next passive phase, the length of $T_{on}$ ($t_a$) must be less than or equal to $2d_{min}/(c\alpha)$, i.e., $t_a \leq 2d_{min}/(c\alpha)$. The upper limit for the length of the active phase $t_a$ is therefore $2d_{min}/(c\alpha)$. Or, inversely, for given $t_a$ and $\alpha$, $d_{min} \geq t_a c\alpha/2$, there is a lower limit on the sensing range.

For given $d_{max}$, $\alpha$, and $t_a$, in order for the leading a proportion 522 of section 520 to fall within the passive phase (during $T_{off}$) of the cycle/subcycle, the length of the passive phase ($t_p$) should be greater than or equal to $(2d_{max}/c-(1-\alpha)t_a)$. That is, $$t_p \geq 2d_{max}/c-(1-\alpha)t_a, \text{ or } t_p/t_a \geq [\alpha r-(1-\alpha)].$$

Combining the above conditions for $t_a$ and $t_p$, the relationships among the parameters can be expressed as $$t_a \leq 2d_{min}/(c\alpha), \text{ and } t_p \geq [\alpha r-(1-\alpha)]t_a.$$

The parameters $t_a$ and $t_p$ can thus be determined or selected once $\alpha$, $d_{min}$ and $d_{max}$ are known or obtained.

In different embodiments, different sensing cycles may have different values of $t_a$ and $t_p$ even though the lengths of the active and passive phases in each cycle are fixed.

In embodiments involving the use of beamforming and beam sweeping patterns for communication and sensing, the values of $t_a$ and $t_p$ may be different for different beams in a given beam sweeping pattern.

Conveniently, such embodiments provide a simple design, and less signaling overhead is required to communicate the signal parameters.

In some embodiments, the signal may be structured to have multiple subcycles in each communication and sensing cycle, where the subcycles have different or variable cycle lengths. In these embodiments, the signal may be defined by specifying the durations of the active and passive phases for different subcycles and cycles. Advantageously, because each sensing cycle has multiple subcycles and the durations of active (ON) and passive (OFF) phases can be different, these cycle lengths can be selected to ensure that the transmission in at least one subcycle can be sensed/received completely. Further, with variable cycle lengths, it is not necessary to have any prior knowledge of the environment statistics.

Figure 6:
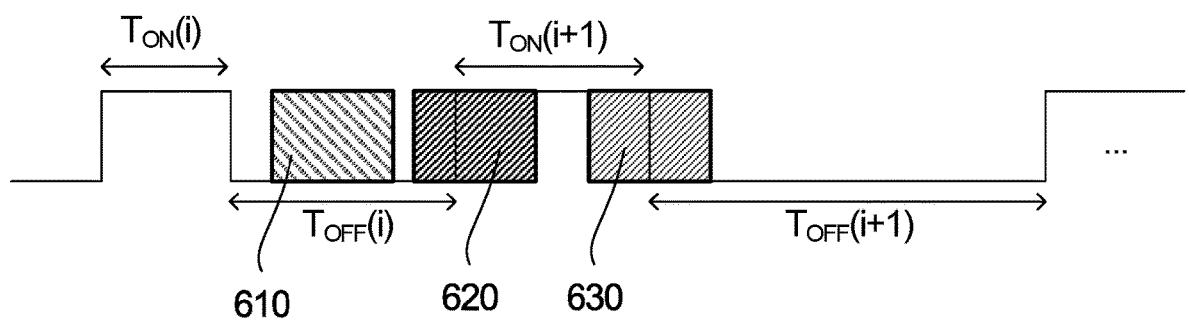
FIG. 6 is a schematic diagram illustrating a signal structure with variable cycle lengths according to an example embodiment of the present disclosure.

FIG. 6 illustrates an example signal structure where the lengths of the active phases ($T_{on}$) in different subcycles are different. The subcycles may be sequentially indexed with an index number i, and represented by the expression $t_a(i)$. In FIG. 6, two subcycles, subcycle i and subcycle (i+1) are shown, with respective phase lengths $t_a(i)$ and $t_a(i+1)$. Time windows 610, 620 and 630 represent different reflections of signals transmitted during active phase (i) and received at different time frames. The sufficient condition to receive at least one transmission completely is to have:

$$t_p(i)=t_p(i+1) \tag{1}$$

$$t_p(i+1)=t_p(i)+t_a(i)+t_a(i+1)=2t_p(i)+t_p(i-1). \tag{2}$$

A solution to Equation (2) is, for any given $t_p(1)$, $t_p(i)=t_p(1)(1+\sqrt{2})^{i-1}$. The duty cycle ratio $$(D_c) \text{ is } D_c = \frac{t_a}{t_p+t_a} = \frac{1}{2+\sqrt{2}} \approx 29.29\%.$$

In the above embodiment, the conditions are set conservatively to ensure that there is no loss in the reception of reflections for at least one subcycle. In different embodiments where some loss (such as a ($=1-\alpha$) portion of the reflected signal) is permissible, the lengths of the active and passive phases can be determined using the following recursive equations:

$$t_a(i+1)=[(1-\alpha)t_a(i)+t_p(i)]/\alpha, \tag{3}$$

$$t_p(i+1)=2t_p(i)+t_a(i). \tag{4}$$

With variable phase (cycle or subcycle) length, sensing performance may be improved as it is possible to obtain full sensing signal reception in such embodiments, and it is not necessary to obtain information about the environment statistics, including the distance range of the targets in the environment.

In some applications, at a receiving node, during each passive sensing phase (or OFF cycle) of each ON/OFF cycle (or subcycle), some transmissions from a transmitting node will be detected by the receiving node (completely or partially). In order to have accurate estimate of the location of the object (based on delay), the receiver needs to know in which subcycle a particular received transmission was transmitted. The reason is that it is possible that a transmission in one subcycle is detected in a different subcycle.

Figure 7:
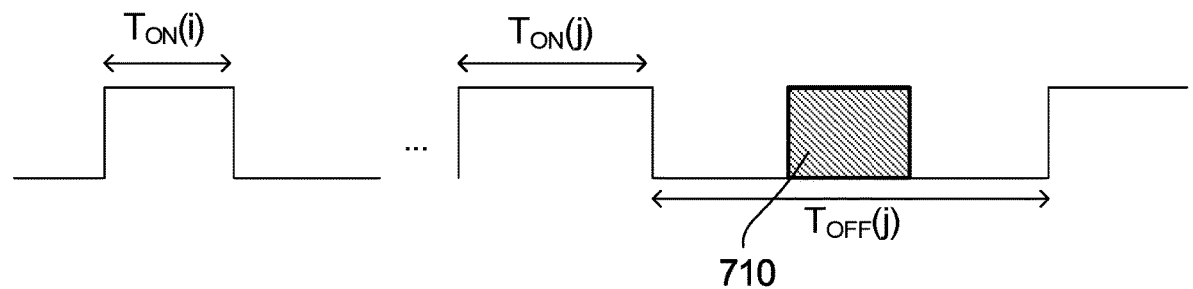
FIG. 7 is a schematic diagram illustrating a signal structure wherein a transmission is received in a different cycle, according to an example embodiment of the present disclosure.

For example, as shown in FIG. 7, the received signal 710, which is received during the passive (OFF) phase of subcycle j, may possibly be transmitted during the active (ON) phase of subcycle j, $t_a(j)$, or subcycle i, $t_a(i)$, or another subcycle before subcycle j. Therefore, designing the sensing signal in each subcycle differently would provide a way to facilitate detection by allowing easy or convenient identification of the detected signal.

Using the example signal shown in FIG. 7 to illustrate, when the signal lengths (the lengths of the active phase) from different subcycles, such as subcycle i and subcycle j, are different, it can be conveniently determined that signal 710 is transmitted during subcycle i based on the length of the detected signal 710 and a determination that the length of signal 710 matches the length of the active phase $t_a(i)$ of subcycle i. A possible advantage of using signals of variable cycle length is thus that as the duration of the active phase varies and is different from subcycle to subcycle, the different cycle lengths can be used to uniquely identify the particular subcycles, and a receiver of the signal can use the length information to determine the subcycle index of the associated subcycle by matching the cycle lengths.

In some embodiments, the signal frame structures may vary from cycle to cycle or from subcycle to subcycle, or the sensing sequence may be cycle-dependent. That is, the sensing signal in different cycles can have different sequences. In some embodiments, the sensing sequence may also be subcycle-dependent.

As an illustrative example, different ZC sequences or pseudo-noise (PN) sequences, such as with different lengths or different roots/generative polynomials, may be used in different subcycles to differentiate and identify the subcycles. Under this approach, even if only a portion of a transmitted or reflected signal is detected, the subcycle associated with the signal can be identified by analyzing the symbol sequences in the signal. In addition, when multiple transmissions are received completely (or even partially), sensing diversity may be achieved by combining the detected signals over different subcycles. If the receiver knows which received signal portion belongs to which subcycle of transmission, the reception performance can be improved and simplified. It may also help to improve Doppler estimation based on the received signals if the receiver can detect signals transmitted in consecutive subcycles and estimate the differential phase rotation between the pulses in one subcycle (intra-subcycle) and in consecutive subcycles (inter-subcycle). The sensing performance may be further improved by including more subcycles in each transmission or sensing cycle.

In some embodiments, it is possible to design a sequence for the entire set of active phases (or the "ON" cycles, e.g., $t_a(1), \ldots, t_a(M)$) and use a portion of the sequence during each subcycle. In this case, each subcycle may have a different sequence, from a different portion of the full sequence.

In some further embodiments, different sensing subcycles in a sequence of sensing subcycles may each have a fixed total cycle length. In this case, if the total duration of a sensing cycle is represented by $T_{se}$ and the number of subcycles is represented by M, then $T_{se}=M(t_a+t_p)$. Once $t_a$ and $t_p$ are determined or obtained based on a method described herein, a linear relationship between $T_{se}$ and M can be determined. Thus, in this case if the value of one of $T_{se}$ and M is known, the value of the other one can be readily determined.

In some embodiments, the total lengths of the subcycles may vary. In this case, in order to obtain at least one full reception of the signal transmitted during a transmission (active) phase or subcycle, the following relationship should be satisfied according to equations (1) and (2) above:

$$T_{se}=t_a(1)[(1+\sqrt{2})^{M+1}-\sqrt{2}-1], \quad (5)$$

where $t_a(1)$ is the duration of the active phase in the first subcycle, subcycle (1).

In Equation (5), there are 3 design parameters, $t_a(1)$, $T_{se}$ and M. From any two of these parameters, the third one may be determined based on Equation (5). For example, given $t_a(1)$ and $T_{se}$, the number of sub-cycles in each cycle can be calculated by: M=

$$\left\lceil \frac{\log\left(\frac{T_{se}}{t_a(1)} + \sqrt{2} + 1\right)}{\log(\sqrt{2} + 1)} \right\rceil - 1.$$

Normally, $t_a(1)$ may be specified based on the sensing bandwidth, expected target distance, the sensing power, and one or more performance metrics such as sensing diversity or accuracy of velocity estimation based on the Doppler effect.

In some embodiments, $t_a(1)$ may be selected under the limiting condition that $t_a(1) \leq (2d_{min}/C)$, where $d_{min}$ is the minimum detectable distance and c is the velocity of light, if the intention is to use the first subcycle in the signal cycles for detection of the closest targets. As a specific example, if the minimum detection range is 3 meters, $d_{min}=3$ m, $t_a(1)$ 20 ns.

In some embodiments, $T_{se}$ may be determined based on certain system parameters and requirements, such as sensing transmit power, sensing bandwidth, the number of beams (for beam steering to cover a given region), sensing overhead, one or more sensing performance metrics (e.g. positioning accuracy), or the like.

In some embodiments, the frame structure of the transmitted signal may be designed or configured to facilitate or improve performance of integrated functions of communication and sensing, such as to facilitate sensing and provide related signaling support. In addition, the frame structure of the transmitted signal may be designed or configured to minimize the negative impact to communications performance and maximize the adaptability to the already existing frame structure and signal design for communications.

For example, a "special frame" may be constructed, and explicitly defined for the active and passive phases in a cycle or subcycle of the transmitted sensing signal. The special frame may be defined based on the duration of the active and passive phases in terms of pre-defined units.

In some embodiments, an option is to define a "virtual" sub-carrier spacing (SCS) or "sensing" SCS, which may be very large, such as on the order of hundred MHz or more. The sensing SCS may be equal to a sensing bandwidth part (BWP). A BWP is the smallest bandwidth allocated for sensing. In practice, multiple BWPs may be allocated and used in combination for sensing. In this case, a basic sensing symbol may be defined as the inverse of the sensing SCS. This is to get the required time granularity for ON/OFF pattern. This way, the duration of all the ON and OFF periods (corresponding to active and passive phases) can be represented by multiples of the defined basic sensing symbol.

Defining a virtual SCS or sensing SCS does not imply or require that only multi-carrier transmission is permitted. Rather, single-carrier transmission may be included as a special case of multi-carrier transmissions where the SCS is equal to the entire transmission bandwidth.

In cases where the signal waveform is a single-carrier waveform, an alternative embodiment would be to define the basic sensing symbol length directly, e.g., $$T_{sym,se}=T_{sym,base} \cdot 2^{-n},$$

where $T_{sym,se}$ is the basic sensing symbol length for sensing and $T_{sym,base}$ is the symbol length for communications, and n can be calculated from $n=\lfloor \log_2(BW \cdot T_{sym,base}) \rfloor$. As can be appreciated, this example follows the concept of scalable numerology, by scaling with a power of 2. The same method can be applied to multi-carrier waveform where $$T_{sym,se}=T_{sym,base} \cdot 2^{-n}, \text{ in which } n=\lfloor \log_2(SCS \cdot T_{sym,base}) \rfloor.$$

A technical challenge to design sensing signals in the present context is how to define and include the required active and passive phases in the sensing signal. As there could be thousands of basic sensing symbols to be included, it may not be feasible or practical to define a signal pattern for so many basic sensing symbols. Therefore, it is desirable to provide a practical way of defining a signal pattern for the active and passive phases and provide a practical signaling mechanism for communicating the defined signal patterns to a potential receiving node such as a UE.

In some embodiments where the durations of active and passive phases are fixed within the subcycles of a sensing cycle, it suffices to define the number of basic sensing symbols each of the active and passive phases would include. For example, the sensing cycle may be expressed as a vector (10, 100, 200), where the first number in the parentheses indicates the number of sensing subcycles, the second number indicates the number of basic sensing symbols in each active phase, and the third number indicates the number of basic sensing symbols in each passive phase.

In some embodiments where the durations of active and passive phases are variable, one possible way of representing the active and passive phases is to represent the active phases by a first vector and represent the passive phases by a second vector. The length of the first or second vector indicates the number of sensing subcycles and each entry in the vector indicates the number of basic sensing symbols in the corresponding active/passive phase. In scenarios where the durations of active and passive phases can be represented by a formula, it suffices to only capture the parameters of the formula and number of subcycles. For example, in the example embodiment discussed above, the duration of the active phase in a subcycle i can be represented as $t_a(1)(1+\sqrt{2})^{i-1}$ and the duration of the passive phase in the subcycle i can be represented as $t_p(1)(1+\sqrt{2})^i$. Therefore, it would suffice to indicate the number of basic sensing symbols in the first active phase (i=1) and the number of sensing subcycles.

These representations may be used for communicating the structure of active and passive phases in the sensing signal to the UEs and other network entities in the form of signaling. The signaling method may include, for example, L1 signaling, or semi-static signaling, using a higher layer signaling such as RRC or MAC-CE.

Figure 8:
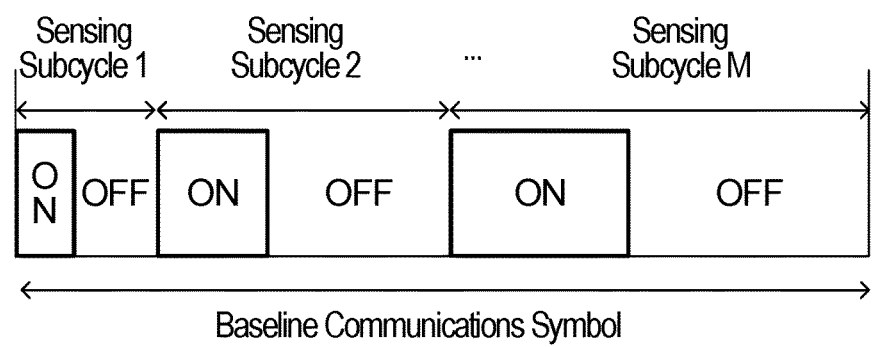

It is recognized that the timing granularity for sensing is much larger than for communications. Therefore, it may not be possible to align all active and passive phases in sensing with regular communications symbols. However, the sensing signal may be configured so that a selected number of the active and passive phases in the sensing signal are aligned with the boundaries of a communication symbol. This has the benefit of aligning of the communications/sensing transmission of one TRP with other TRPs in the network. An example is illustrated in FIG. 8, where the sensing subcycles 1, 2, . . . , M are aligned with a baseline communication symbol. It should be appreciated using this frame structure definition for communications and sensing signals, it may not be possible to embed or multiplex DL or UL communications data into the sensing signal.

Another aspect of the frame structure and numerology design for sensing signal is to use time space resource to replace frequency space resources. For example, in this regard a sensing BWP may be first defined and the numerology (basic sensing symbol time) may be subsequently defined and structured accordingly.

It has been recognized that a UE may not have the full capability of receiving and processing the entire sensing bandwidth. For example, the whole sensing bandwidth may be 1 GHz but some UEs can only process signals with a bandwidth of up to 250 MHz. In this case, if the sensing signal were to be transmitted with a single-carrier 1 GHz bandwidth, the UE would not have the frequency granularity to process it. However, if the sensing signal is transmitted as 4 separate sensing BWPs, with or without hopping, the UE can receive and process the entire signal bandwidth. In this case, the frequency hopping pattern can also be regarded as frame structure parameter and should be specified in addition to other sensing signal parameters.

By defining such frame structures and numerology, it is possible to map system parameters/requirements to sensing signal parameters.

Figure 4C:
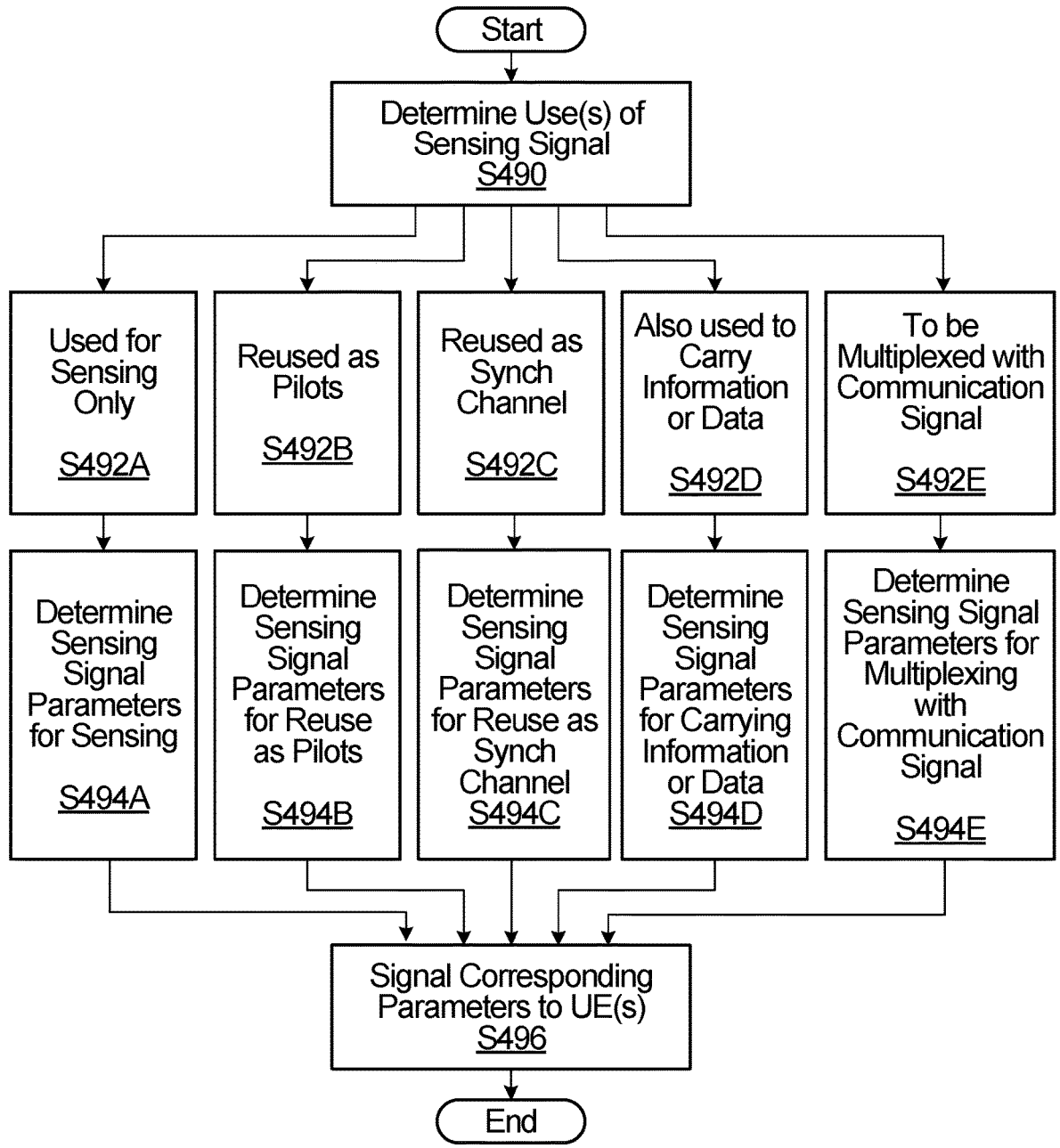
FIG. 4C is a flow chart illustrating an example operation process of an electronic device, according to an embodiment of the present disclosure.

The sensing signal may be configured for one or more purposes, and different sensing signal parameters may be signaled to an electronic device based on the different purposes or uses of the sensing signal, as illustrated in FIG. 4C.

At S490, the purposes or uses of the sensing signal is determined, such as by a network entity, which can be a network device in a network, or a UE, or BS.

In some embodiments, the sensing signal is used only for a sensing purpose, as illustrated at S492A in FIG. 4C. In this case, the frame structure should be defined in such a way to reserve certain time slots for sensing-only. A non-limiting example is shown in FIG. 3B, in which the transmission frame 350 includes consecutive slots/symbols of UUUUSSSSSSDDDD, where U denotes the uplink slots or symbols, S denotes the sensing-only slots/symbols and D denotes the downlink slots/symbols. It should be understood that this example is merely for illustration, and frame structures with other combination and ordering of U, S, and D slots/symbols are possible. For example, the frame structure may be SSDSUSDDSUSU, or DDSSUUSDDUUSS, or the like.

In some embodiments, the configuration of the S symbols/slots can be different from the D and U symbols/slots. For example, as shown in the example frame 360 of FIG. 3C, the duration of the S symbols/slots can be chosen shorter than the duration of D or U symbols/slots. In some embodiments, S slots may be configured not to include synchronization (SYNCH) channel and/or basic broadcast channel. It can be understood that UE may not need to do blind control signal detection in S slots and may not transmit anything in S slots.

Figure 3D:
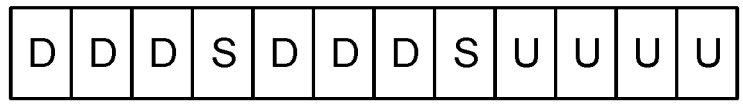

In some embodiments, the sensing signal may be reused as reference signals or pilots (such as common pilot) for channel measurement purpose, as illustrated at S492B in FIG. 4C. An example frame 370 is shown in FIG. 3D, in which the frame structure includes the symbol/slots of DDDSDDDSUUUU where S symbols/slots contain reference signals which are used for channel measurements at the UE side. In this case, the UE may need to know the sensing signal parameters including parameters for the frame structure, such as the sensing symbol/slot indices and sensing symbol/slot duration, waveform type, waveform parameters, pilot sequence and the like.

Figure 3E:

In some other embodiments, the sensing signal may be reused as a synchronization (SYNCH) channel, as illustrated at S492C in FIG. 4C. An example frame 380 is shown in FIG. 3E in which the frame structure includes the symbol/slots of SSSSDDDDUUUU, where the S symbols/slots can be reused as a SYNCH channel. In this case, the UE may need to know the sensing signal parameters including the BW of the SYNCH signal, the frame structure such as the sensing symbol/slot indices, the SYNCH channel indices among the sensing symbols/slots, the sensing symbol/slot duration, the waveform type, waveform parameters, the SYNCH channel sequence, and the like.

In some embodiments, when the sensing signal is transmitted by a UE, the sensing signal can be reused as initial access channel. For example, in the frame 380 of FIG. 3E, an S slot/symbol in the frame structure may provide an initial access channel. In this case, the UE may need to know the sensing signal parameters including the BW of the initial access signal, frame structure including the sensing symbol/slot indices and the initial access channel indices among the sensing symbols/slots, sensing symbol/slot duration, waveform type, waveform parameters, initial channel sequence, and the like. In some embodiments, this information may be signaled by the network to the UE. In some other embodiments, a part of the information may be obtained by the UE through a mapping function between UE identification (id) and the parameter. For example, an initial access sequence can be obtained by the UE through a mapping function between the UE id and the initial access sequence.

Figure 3F:
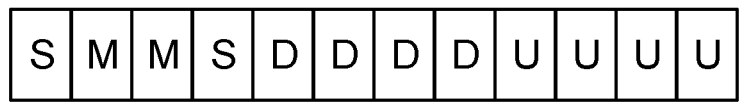

In some embodiments, when the sensing signal is transmitted by a UE, the sensing signal can also carry information or communications data such as signaling data, control data, or payload data, as illustrated at S492D of FIG. 4C. The communications data may be embedded in the sensing signal by any suitable multiplexing technique, as illustrated at S492E of FIG. 4C. An example frame 390 is illustrated in FIG. 3F, where M denotes slots/symbols for sensing signals multiplexed with communications data. As illustrated in FIG. 3F, some of the sensing symbols/slots may be used for sensing only (denoted as S), while other sensing symbols/slots are multiplexed with communications data.

Figure 3G:

In some embodiments, when the sensing signal is transmitted by a UE, the sensing signal can also carry embedded communications data. An example frame 392 is illustrated in FIG. 3G, where E denotes slots/symbols for sensing signals embedded with communications data. As illustrated in FIG. 3G, it is possible some of the sensing symbols/slots may be used for sensing only (denoted as S), while other sensing symbols/slots are used to embedding communications data.

As can be appreciated, the frame structures illustrated in FIGS. 3B-3G may be modified and readily adapted for use by a BS or sidelink transmissions between UEs.

While it is not necessary for target sensing, the sensing signal may nonetheless be configured to carry information and data. For example, a TP operating in the HDX monostatic mode may embed data in the sensing signal transmission so that UEs can receive and decode the signal to obtain the transmitted data and information. Such an embodiment may save the overhead of sensing by performing both functionalities of communications and sensing simultaneously. When the same node transmits the sensing signal and communication signal, and processes the reflection of the sensing signal, the node would already have knowledge of the transmitted communications/sensing signal, embedding communications data in the signal does not affect the sensing performance.

For example, the sensing signal may include broadcast information intended for all UEs in a coverage area. The sensing signal may also include multicast or groupcast information or data. In some embodiments, the sensing signal may include unicast data and information if beamforming is applied.

In some situations, the TP can use the sensing signal to send location-dependent information to the UEs in a given area, which would be of interest to all UEs in the area. In such a case, the UEs need to know the configuration details of the sensing signal in order to decode the signal, and refrain from transmitting during the transmission period(s) of the TP. This requirement would need to be addressed by the signal design or configuration.

For example, the structure of the signal should allow convenient and reliable detection of a sufficient portion of the transmitted signal so that the transmitted data or information can be communicated to from the TP to the UEs.

In some embodiments, when only very limited information is to be carried by the sensing signal, a SeN can use different sensing sequences to communicate this information. For example, a TP can select the sensing sequence from a set of sensing sequences, $S=\{S_1, S_2, \ldots, S_2^M\}$, to carry M bits of information. In this case, a receiver of the information may need to have knowledge of the set of sensing sequences S, or an indication of the set. In some embodiments, a plurality of sensing sequences may be transmitted to carry more information. For example, if N sequences are transmitted each containing M bits of information, the total of N*M bits can be carried in the sensing signal.

It is recognized that the timing granularity for sensing is much larger than for communications and hence the duration of the basic sensing symbol is much shorter than the regular communications symbol duration defined, for example, in NR (New Radio). If communications data is to be embedded in the sensing signal, the communications symbol should not be longer than the duration of the active phase when the node is transmitting the communications/sensing signal, and the duration of the communications symbol should not be longer than the duration of the passive phase when the node is receiving the communications/sensing signal.

In some embodiments, sensing-specific or special communications frame structure can be defined for the transmission frames sensing is performed. As an example, sensing-specific or special communications frame structure and numerology can be defined to follow the sensing frame structure such that each DL symbol follows the corresponding active phase and each UL symbol follows the corresponding passive phase. This way, when a TRP is performing active sensing, the TRP can embed DL data into the sensing signal, and during the passive sensing phase, the TRP can simultaneously detect reflection of sensing signal and UL data. This way, communications signal follows the same frame structure and numerology as the sensing signal, which simplifies signaling, transmission, and reception of the signals.

Another aspect to be considered when embedding data into the sensing signal is that sensing and communications performance optimization may require different parameter settings. For instance, when a single-carrier waveform is used for communications/sensing, partial overlapping between base pulse shaping functions may improve the sensing performance but may have a negative impact on the communications performance due to intersymbol interference (ISI). Therefore, to embed communicate data and information in the sensing signal with a single-carrier waveform where the base functions partially overlap, an upper threshold for the partial overlap ratio may be set to limit or minimize ISI. In addition, the pulse shaping functions may be selected or structured to limit or minimize interference to neighboring pulses in the time domain.

In some embodiments, when a multi-carrier waveform, such as CP-OFDM, is used for communications/sensing, the parameters of the signal design including the CP length may be designed or selected according to the requirement of the communications/sensing performance.

In some embodiments, depending on the durations of the active and passive phases in a sequence of cycles with subcycles, a first subset of the subcycles may be configured to carry information for the UEs and a second subset of the subcycles may be configured to carry no information or data. With such configurations of the sensing signal to carry data or information, signal resources are more efficiently utilized.

In some embodiments, data may be included in the sensing signal by multiplexing, such as for communicating data to UEs. In this context, multiplexing refers to including communication data in a transmission frame of a sensing signal that is originally envisioned for sensing operation. Such communication may be desired, for example, in cases of urgent data transmission to selected UEs. For example, in an urgent situation, the sensing signal may be reconfigured temporarily to embed the data to be sent to the UEs. In such a case, the SeN or TP transmitting the signal does not need to decode the reflected signal, and sensing performance is not compromised by embedding the data in the sensing signal.

As an example, in some embodiments, communication of data and sensing signal with multiplexing may be carried out through a downlink (DL) data transmission, such as from a TP (e.g. a base station) to one or more UEs. The TP may construct the sensing signal based on any suitable method or technique as described herein. Depending on the resource allocation for the UEs scheduled to receive DL transmission data, the sensing signal may be filtered before transmitted through the DL channel to reduce or avoid interference with the DL signals received by the UE(s). Such filtering is also referred to as "puncturing" of the sensing signal by data. Puncturing can be done in the frequency domain or in the time domain. The data transmitted with the sensing signal to the scheduled UEs can include either or both of control data and payload data. In some embodiments, the TP may send a notification to the UE(s) indicating the upcoming scheduled transmission over the current or upcoming sensing cycle or subcycle, which may indicate one or more of, for example, the sensing subcycle index, time resource scheduling index, frequency resource scheduling index, beamforming index, and the like. This notification can be provided by dynamic signaling (L1 signaling). In different embodiments, this notification may be sent over the same or a different carrier/link than the carrier/link for the data/sensing transmission. In some embodiments, an allocated frequency and time resource for data transmission may be pre-selected/determined, and the UE(s) can monitor the particular allocated resource to determine if there is any upcoming transmission of a sensing signal with data.

In some embodiments, communication of data and sensing signal with multiplexing may be carried out through an uplink (UL) data transmission. The UE may perform UL data transmission during the passive phase (OFF cycles) at TP, and the TP may perform both UL and sensing detection at the same time during the passive phase. It is possible for the TP, or the network, to select or define some subcycles in each cycle for UL data transmission, and the UE can then be scheduled, or be configured to perform, UL transmission during these selected subcycles. Such an approach may be taken for UL grant-free or configured grant transmission, which is delay sensitive and should be transmitted as soon as possible. For UL transmission to be performed in only designated subcycles, the UE needs to know which subcycles are designated and configured for UL transmission, and the configuration/frame structures of these designated sub-cycles. Such information can be signaled to the UE(s) through a higher layer signaling, such as RRC or MAC-CE. In some embodiments, more detailed information including the time/frequency transmission resource, beamforming information, power control, and modulation and coding scheme (MCS) of the UL transmission can also be determined and communicated to the UE. The detailed information may be communicated to the UE(s) through dynamic signaling, such as L1 signaling, or through a higher layer signaling.

In some embodiments, communication of data and sensing signal with multiplexing may be carried out through a sidelink (SL) data transmission. In case the SL signal is transmitted from the UE performing the sensing transmission, the multiplexing procedure and signaling follows the sensing and DL data multiplexing. In case the SL signal is received by the UE performing the sensing detect, the multiplexing procedure and signaling follows the sensing and UL data multiplexing. In case the sensing signal is transmitted from another node (other UE or a TP), multiplexing might not be required in some scenarios, including when the receiver of the sensing signal is sufficient far from the transmitter of the SL signal. For example, if the TP is performing sensing and it is far from the SL transmitter, the SL signal does not affect the sensing performance, and hence the SL signal transmission may not change. However, if SL transmission might affect the sensing reception, the SL transmission may be scheduled for transmission during the active phases of the sensing transmission. In some embodiments, the SL transmission may be scheduled to take place during a subset of subcycles of sensing transmission frame. For SL transmission to be performed in only designated subcycles, or active phases of selected subcycles, the UEs need to know which subcycles are designated and configured for SL transmission, and the configuration/frame structures of these designated subcycles. Such information can be signaled to the UEs through a higher layer signaling, such as RRC or MAC-CE. In some embodiments, more detailed information including the time/frequency transmission resource and power control, and modulation of the SL transmission can also be determined and communicated to the UEs. The detailed information may be communicated to the UEs through dynamic signaling, such as L1 signaling, or through a higher layer signaling.

Communication of data and sensing signal with multiplexing may improve resource efficiency and interference management.

The sensing signal may be further constructed or configured to address various technical problems that may arise. For example, a potential problem that may arise is that, for a given sensing bandwidth (BW) and frame structure based on pulse sensing, where $t_a$ may indicate the duration of the active phase in a particular subcycle, or the total duration of all active phases in all subcycles within a given cycle, i.e. $t_a = \sum_{i=1}^{M} t_a(i)$, how to configure the sensing signal s(t) to provide satisfactory or improved sensing performance, particularly range resolution, with a minimum out-of-band leakage or equivalently spectrum localization.

As can be understood, spectrum localization may mainly depend on the waveform and pulse shaping of the sensing signal.

The range accuracy performance depends on the characteristics of the signal autocorrelation function $R_s(\tau)$, which may be expressed as:

$$R_s(\tau) = \int_{-\infty}^{\infty} s(t-\tau) s^*(t) dt.$$

More generally, to also take into account of the Doppler effect, a suitable metric for assessing autocorrelation is the ambiguity function given by:

$$\chi(\tau, f_d) = \int_{-\infty}^{\infty} s(t-\tau) e^{j2\pi f_d t} s^*(t) dt,$$

where $f_d$ is the Doppler frequency. The ambiguity function $\chi(\tau, f_d)$ reduces to the autocorrelation function $R_s(\tau)$ when the Doppler shift is zero, i.e., when $f_d=0$, $R_s(\tau)=\chi(\tau, 0)$. To improve range accuracy, it is desirable to reduce $R_s(\tau)$ for $\tau \neq 0$ to a very small value.

In embodiments where a node is operated to receive communication and sensing signals in a HDX monostatic mode, a portion of the signal transmitted to the node from another node can be missed at the node (i.e. not received) when the node is in its active phase (transmitting phase). In this case, a more proper metric may be an aperiodic autocorrelation function, which may be expressed as $r_s(\tau)$, $r_s(\tau) = \int_{T_{off}} s(t-\tau) s^*(t) dt$, where the integration is over the passive phase during which the SeN can listen to the reflected signal.

It is desirable to provide a signal structure or configuration, which is flexible to provide the needed sensing parameters even when a portion of the reflected signal is missed and not detected/sensed by the SeN during the passive phases. In other words, the signal is structured so that the needed parameters are provided by a portion of the signal that will be received by the SeN during a passive phase. Such a portion in the signal can be located at the end of the signal or at the beginning of the signal depending on the target distance.

Regardless of the signal shape, a signal with a bandwidth of BW can have N degrees of freedom available for signal design, where N=BW*$t_a$. For example, if BW=1 GHz and $t_a$=100 ns, there are 100 degrees of freedom for the signal design. That is, the signal can be characterized by 100 mutually orthogonal signal structures over the time period of 100 ns ($t_a$). In the mathematical form, $s(t)=\Sigma_{n=1}^{N}c_n s_n(t)$, where $\int_{t_a} s_n(t)$, where $\int_{t_a} s_n(t) s_m^*(t)dt=0$ for n≠m, where $c_n$ represents the weighting symbols (symbol sequence). As will be discussed later, the orthogonality condition may be relaxed in some embodiments.

The design parameters for a signal used in a HDX monostatic system can thus include base functions ($\{s_n(t)\}_{n=1}^{N}$) and weighting symbols ($\{c_n(t)\}_{n=1}^{N}$), which may also be referred to as the "sensing signal sequence."

The weighting symbols $\{c_n(t)\}_{n=1}^{N}$ can affect both autocorrelation and spectrum shape, but their main impact would be on autocorrelation, particularly aperiodic autocorrelation.

Once an optimized set of the weighting symbols and aperiodic autocorrelation functions are determined, the optimized weighting symbols and autocorrelation functions may be saved and stored for further use in different applications.

While other, or more optimal, signal sequences may be determined and used depending on the particular applications in various embodiments, some example sequences, such as the ZC sequences, are discussed next for illustration purposes.

For a single-carrier waveform, the orthogonality domain of the base function is in the time domain. In other words, each function $s_n(t)$ spans only a portion of the time duration: $\text{span}(s_n(t))=[t_{n,1}, t_{n,2}]$ such that $U_{n=1}^{N} \text{span}(s_n(t))=t_a$. In case of orthogonal base functions, $\text{span}(s_n(t)) \cap \text{span}(s_m(t))=\phi$.

Figure 9:
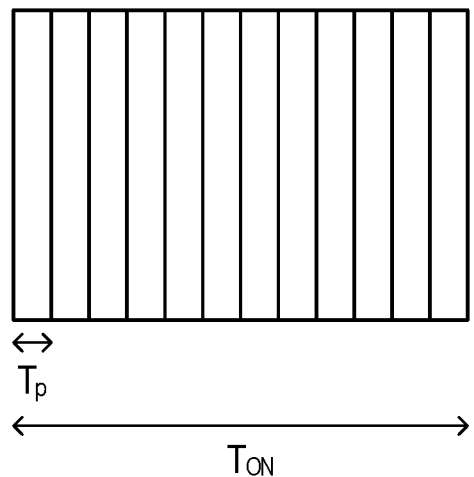
FIG. 9 is a schematic diagram illustrating a single-carrier signal waveform with no overlap between adjacent pulses.

One way to provide the above properties is to divide the active phase ($T_{on}$) into N equal time slots and construct the sensing signal as $S(t)=\Sigma_{n=1}^{N} c_n S_p(t-nT_p)$, where $S_p$ is an ultra-narrow pulse signal with duration $$T_p = \frac{T_{ON}}{N},$$

as illustrated in FIG. 9 with N=12.

For communication purposes, it is desirable to receive all of the information carried by a transmitted signal, and any interference between the base functions can be destructive and should be avoided. For this reason, it may be desirable to use orthogonal (or semi-orthogonal) base functions with no or only minimal overlap for communications. For radar-based sensing, however, it is not necessary to receive, for example, all the symbols carried by the signal and it may be sufficient to be able to obtain certain information for assessing some properties of the signal. Therefore, the orthogonality conditions can be more relaxed for sensing purposes.

Figure 10:
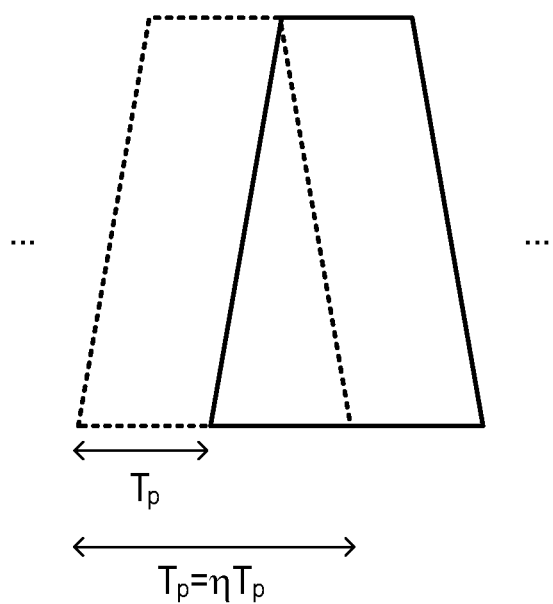
FIG. 10 is a schematic diagram illustrating a single-carrier signal waveform with overlapping of pulses.

Accordingly, in some embodiments, the signal may be configured to have pulse shapes that partially overlap, as illustrated in FIG. 10. In this case, the signal may be expressed as: $S(t)=\Sigma_{n=1}^{N} c_n S_p(t-nT_p)$, where $S_p$ is the prototype function with duration $T_w=\eta T_p$, and $$T_p = \frac{t_a}{N}.$$

ne parameter η may De referred to as a time stretching factor, which indicates the extent of overlap between adjacent base functions.

The shape of $S_p$ determines the frequency spectrum, and can be selected by those skilled in the art. In some embodiments, $S_p$ may be a Gaussian function such as those used in ultra-wideband (UWB) pulses), a sinc function, or a raised cosine function, or the like.

Allowing the signal base functions $S_n(t)$ to partially overlap in time would provide more efficient use of the time resources in the context of integrated communications and sensing signal for HDX monostatic operation.

Conveniently, the partial overlap of the signal base functions allows extension of the time duration of useful signal and more fuller or efficient use of the available time resource, and allows designing pulse shaping filters to control the out of band leakage.

In some embodiments, the sensing signal may have a configurable multi-carrier waveform. The sensing signal may be configured with filtered-CP-OFDM and configurable CP length.

In a multi-carrier waveform, the base functions can be expressed as: $s_n(t)=c_n \exp(j2\pi n\Delta ft) S_p(t)$, for $0 \le t \le T_{on}$, where $$\Delta f = \frac{1}{T_{ON}}.$$

The prototype function $S_p(t)$ may be optimized for spectrum localization.

With a multi-carrier waveform, all base functions can completely overlap with each other in the time domain, but they are mutually orthogonal over the time span of $0 \le t \le t_a$.

In the above expressions of the base functions, $s_n(t)$ are continuous functions. In practice, sampled versions of $s_n(t)$ will be constructed and transmitted, which is equivalent to inverse fast Fourier transformation (IFFT) of the symbol sequence $c_n$. In addition, a CP can be inserted after IFFT.

For HDX monostatic sensing, a portion of the sensing signal may be missed when the SeN is in the active phase. Thus, the signal structures for HDX monostatic sensing need to be configured differently to account for such missed signal portion, as compared with normal communications transmission or full-duplex sensing, where the entire signal can be received and processed at the receiver side. For example, cyclic-prefix (CP) may not be necessary, as a CP may be completely missed in any event. In some embodiments, however, CP may be used to provide better range response or frequency localization.

Thus, in some embodiments, the multi-carrier waveform may be structured to include configurable filtered-CP-OFDM, where the CP length is adjustable to balance the tradeoff between sensing performance (aperiodic autocorrelation function) and spectrum localization, and filtering is performed to further enhance spectrum localization.

The sensing performance of some sample signal structures has been evaluated. The sample signals are characterized by an autocorrelation function with spectrum localization of a single-carrier waveform and different design parameters as listed in Table I. The signal base function $S_p$ is a raised cosine function.

TABLE I

| Parameter | Value |
| --- | --- |
| Prototype function | Raised cosine function with the formula:<br>$$S_p(t) = \frac{\sin(\pi\beta t/PW)}{\pi\beta t/PW} \frac{\cos(\pi\alpha\beta t/PW)}{\left(1-\left(\frac{2\pi\alpha\beta t}{PW}\right)^2\right)}$$<br>with $\alpha = 0.34$ and $\beta = 1.52$. |
| Bandwidth | 1 GHz |
| $t_p$ | 100 ns |
| Number of pulses | N = 100 |
| Pulse Width (PW) | 1 ns |
| Sequence ($c_n$) | ZC with root = 1 |
| η | 2, 4 |

Figure 11:
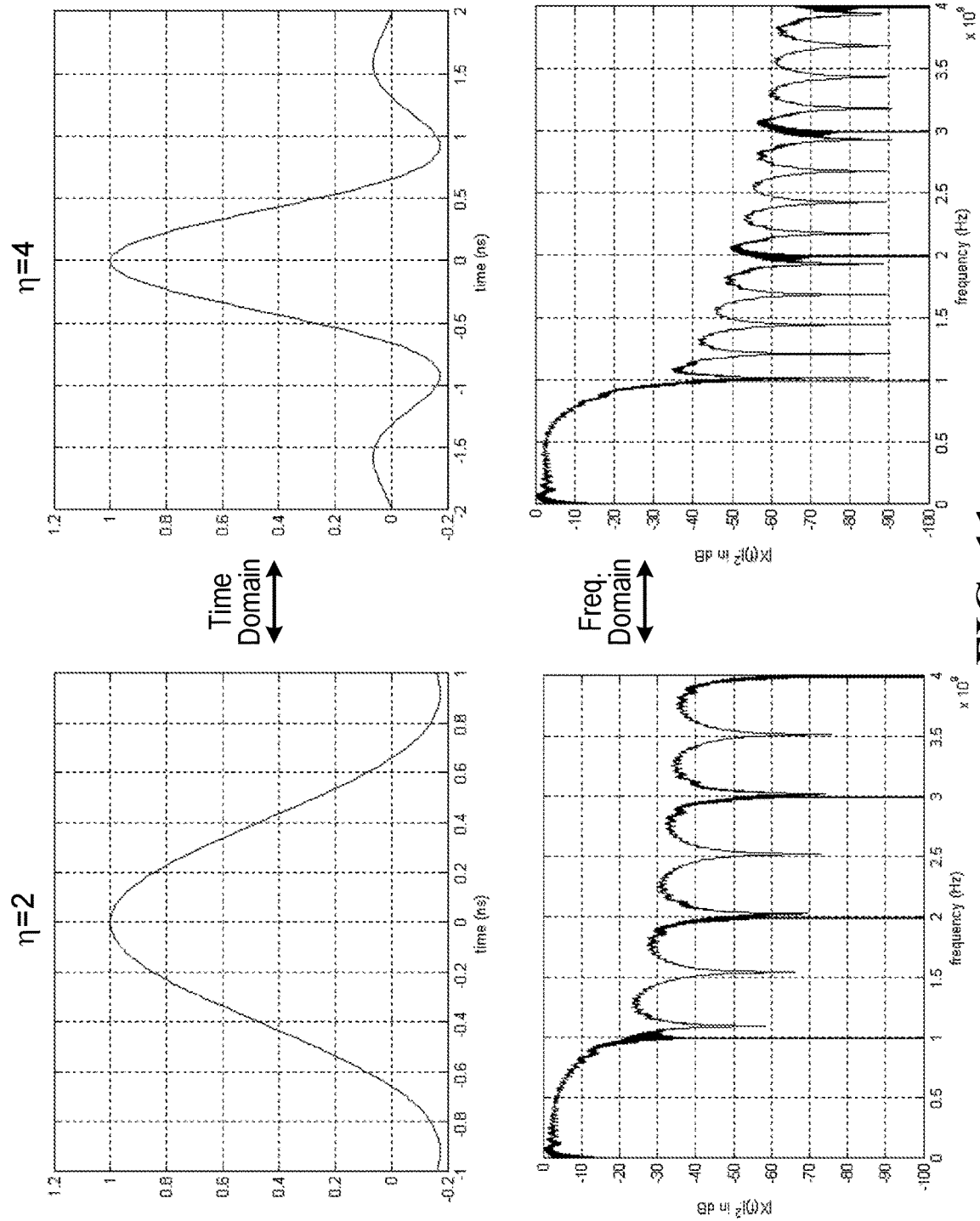
FIG. 11 shows line graphs illustrating time and frequency responses of a single-carrier signal with different time stretching factors.

FIG. 11 shows representative time and frequency responses of sample signals with η being 2 or 4. As can be seen, with a larger stretching factor (η=4), better frequency localization can be achieved, as compared to the smaller stretching factor (η=2).

Figure 12:
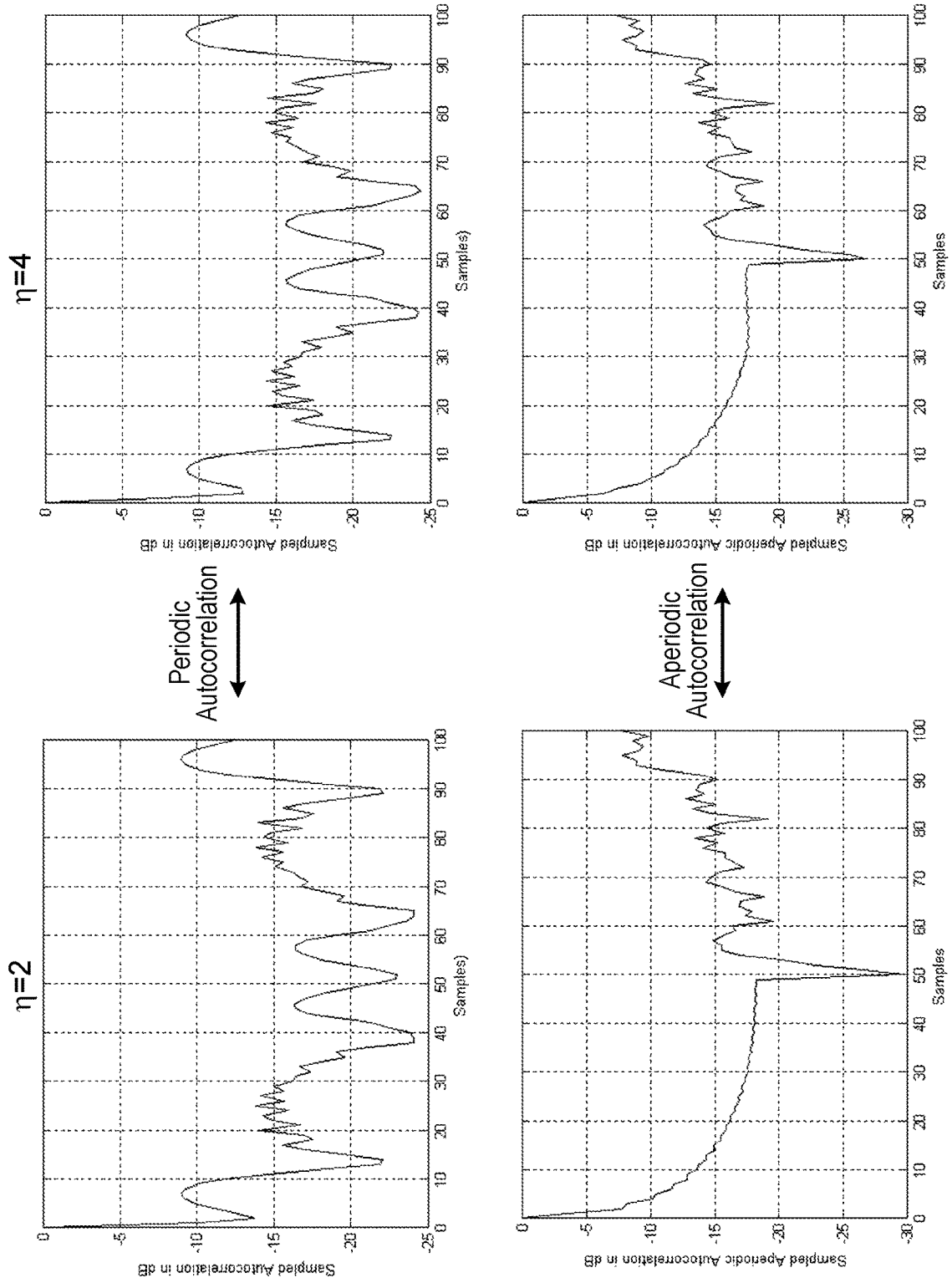
FIG. 12 shows line graphs illustrating autocorrelation in a single-carrier signal with different time stretching factors.

FIG. 12 shows representative results of signal autocorrelation (both periodic and aperiodic) of the sample signals. As can be seen, the signal autocorrelations, which are indicative of sensing performance, are not significantly affected by the values of the stretching factor. The above results indicate that partial overlapping of the pulses for sensing signals can be beneficial for improving the overall performance of an integrated communications and sensing system.

Conveniently, such a system can allow flexibility in the signal design, and provide better sensing performance and spectrum localization.

In another example, the sensing performance of sample signal structures of multi-carrier signals was evaluated.

Sample waveforms of such signals were evaluated to assess the impacts of the relevant design parameters on the sensing performance and spectrum localization. The signal parameters of evaluated waveforms are listed in Table II. Representative results are shown in FIGS. 13 and 14.

TABLE II

| Parameter | Value |
| --- | --- |
| Bandwidth | 1 GHz |
| $t_\alpha$ (OFDM symbol length) | 100 ns |
| Number of subcarriers | N = 100 |
| Sequence ($c_n$) | ZC with root = 1 |
| Filter impulse response (if filtering is enabled) | $f(n) = p(n) \cdot w(n)$ where $p(n) = \text{sinc}(t/t_w)$ and $w(n) = 0.5[1 + \cos(\pi|t|/t_w)]$ and $t_w = 1$ ns |
| CP overhead | 0, 20%, 30% |
| Sub-carrier spacing | 10 MHz, 12.5 MHz, 14.3 MHz |
| Portion of missed symbol on detection (worst case) | 50% (i.e., $\alpha = 0.5$) |

Figure 13:
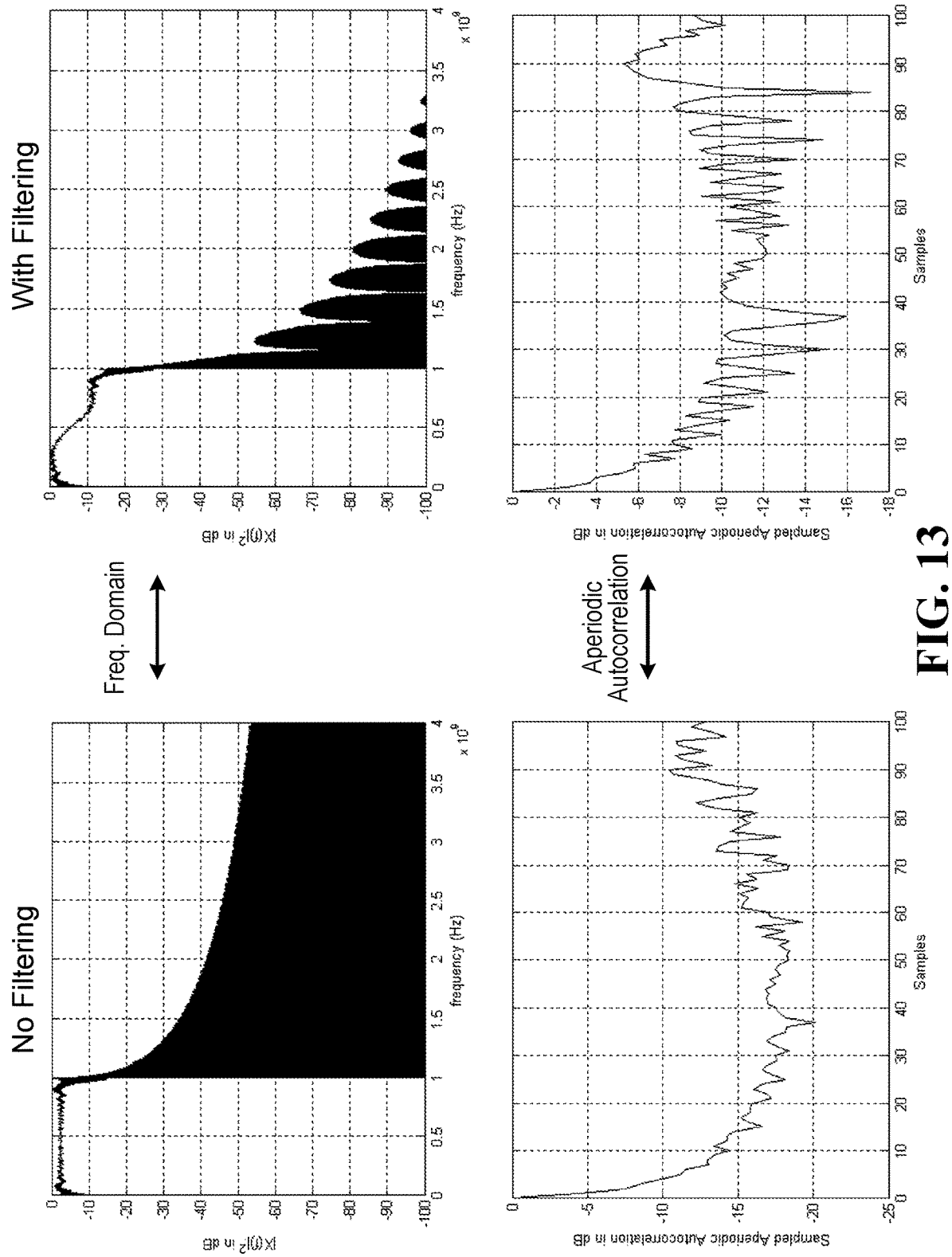
FIG. 13 shows line graphs illustrating frequency localization and autocorrelation in a multi-carrier signal with or without filtering.
Figure 14:
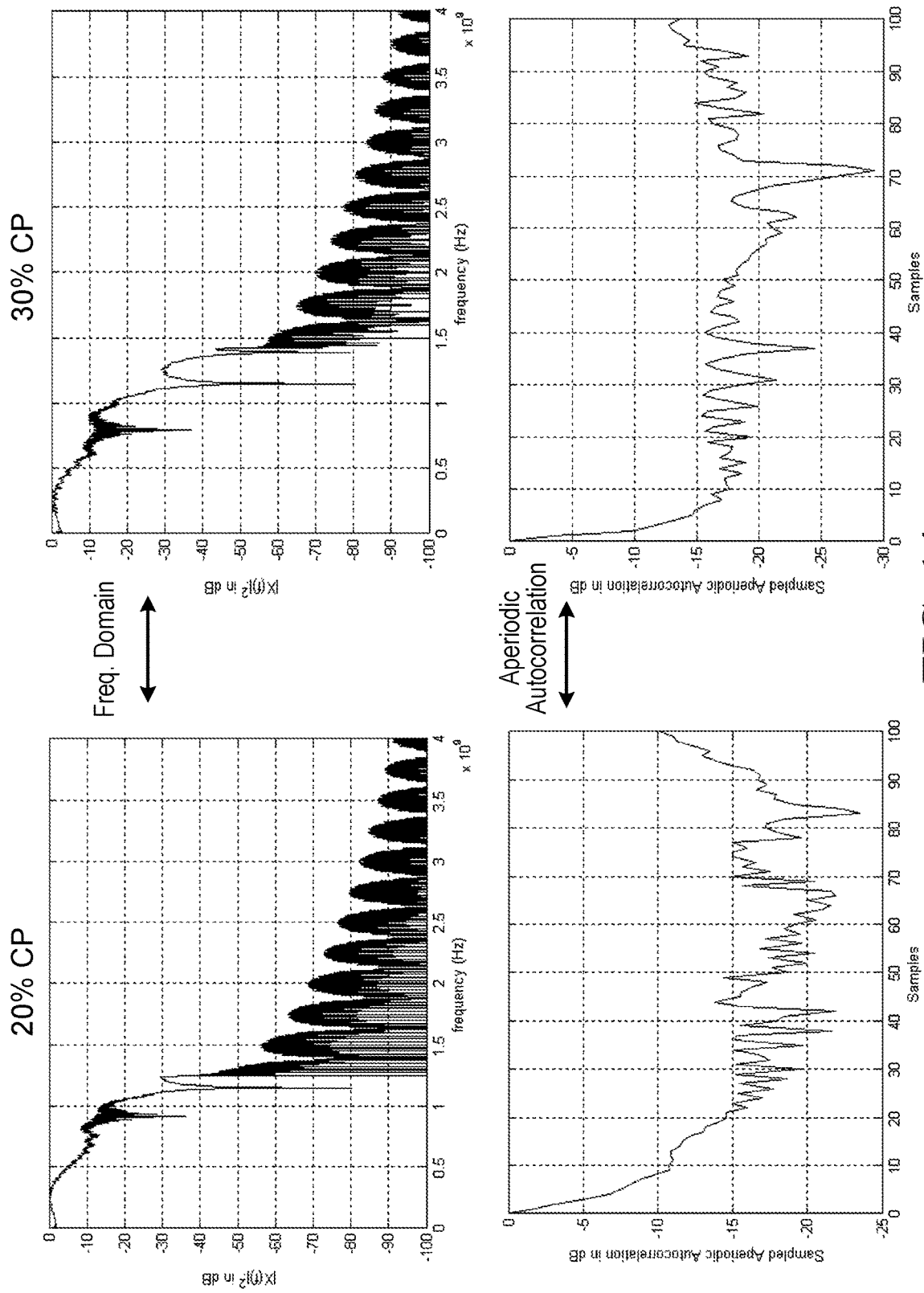
FIG. 14 shows line graphs illustrating frequency localization and autocorrelation in a filtered multi-carrier signal with different length ratio of the cyclic prefix (CP)

FIG. 13 shows the impact of filtering on the sensing performance and spectrum localization when no CP is included. As can be seen, although filtering improves the spectrum localization, it also reduces signal autocorrelation, which has a negative impact on sensing performance.

FIG. 14 shows the performance of filtered-CP-OFDM with configurable CP portions of 20% and 30%. As can be seen, including CP and increasing the CP length can lead to better range responses, with slight compromise on spectrum localization.

From the results it can be expected that, for given sensing performance and frequency localization requirements, the design parameters, particularly the filtering functions and the CP lengths, may be adjusted and selected to meet these requirements.

It can also be expected that multi-carrier waveforms with configurable CP-OFDM can provide more flexibility to signal design and configuration, and provide fine tune to balance the desired sensing performance and spectrum localization.

Returning to FIG. 4C, once the use(s) or purposes of the sensing signal has been determined the corresponding sensing signal parameters may be determined accordingly, such as at one or more of S494A, S494B, S494C, S494D, or S494E respectively.

The corresponding sensing signal parameters can then be signaled to one or more network entities such as UEs, BSs, or the like, as illustrated at S496 in FIG. 4C and further discussed next.

In some embodiments, signaling support may be provided to communicate the parameters, configuration and structure of the sensing signal.

In some embodiments, the signaling is to indicate one or more of the following: A) the sensing signal is only used for sensing, B) the sensing signal is reused as a reference signal, C) the sensing signal is reused as SYNCH channel, D) the sensing signal carries information or data, and E) the sensing signal is multiplexed with communications signal. The content of the signaling may be dependent on the determination at S490 in FIG. 4C.

In case that sensing signal is used for only sensing (see S492A and S494A of FIG. 4C), signaling may include the frame structure including the ordering of U, D, and S symbols/slots, indices of S symbols/slots, duration of S symbols/slots compared to U/D symbols/slots (in absolute or relative scale), parameters of sensing signal including the bandwidth, numerology, frame structure including sensing cycle duration, number of subcycles in a cycle, configuration of each subcycle including duration of active/passive phases, sensing symbol/slot configuration, numerology, waveform type, waveform parameters including the pulse shape, sequence, time stretching factor and the like.

In the case that sensing signal is reused as reference signal/pilot (see S492B and S494B of FIG. 4C), the signaling may also include the pilot sequence, indices of sensing symbols/slots used for pilot and the like.

In the case that sensing signaling is reused as synchronization (SYNCH) channel (see S492C and S494C of FIG. 4C), signaling may also include bandwidth of Synch signal, SYNCH channel indices among the sensing symbols/slots, SYNCH channel sequence and the like.

For embedding data in a sensing signal (see S492D and S494D of FIG. 4C), the following information by be signaled to the receiving device such as the UEs: sensing frame structure including the durations of the active and passive phases (as absolute values, or based on multiples of a defined duration, such as the basic sensing symbol duration discussed above); the number of subcycles in each sensing cycle, the subcycle indices of the subcycles that will carry data; and the waveform, numerology and pulse shape functions of the sensing signal.

In some embodiments, where embedding data in a sensing signal by transmission of sensing sequences, the signaling signal or signaling portion in a signal may also include the sensing sequence set, $S=\{S_1, S_2, \ldots, S_2^M\}$, or an indication of the set.

In case the data will only be carried in a portion or subset of the allocated sensing bandwidth, for example, in a BWP or in a portion of the BWP, information indicating the allocated bandwidth/frequency resources should also be signaled to the receiving device.

The signaling may be in the format of broadcast signaling to all UEs intended in a given coverage region, multicast intended for multiple UEs, groupcast intended for only a group of UEs or unicast intended for a single UE.

The signaling may be dynamic, such as L1 signaling in the form of dynamic control information (DCI), or may be semi-static signaling, for example using a higher layer such as RRC or MAC-CE. In some embodiments, the signaling may be part of the initial access signaling.

For multiplexing of sensing signal and data (see S492E and S494E of FIG. 4C) in DL, signaling may be provided for the following information: indication of the indices of the punctured subcycles such as through dynamic signaling, e.g. L1 signaling or higher layer signaling by, e.g., RRC or MAC-CE; and indication of the time/frequency resources, MCS, beamforming/precoding information, or the like, such as through dynamic signaling, e.g. L1 signaling, or through higher layer signaling.

For multiplexing of sensing signal and data (see S492E and S494E of FIG. 4C) in UL or SL, signaling may be provided for the following information: indication of subcycles designated for UL/SL transmission, such as through dynamic signaling, e.g. L1 signaling or higher layer signaling by, e.g., RRC or MAC-CE; Indication about time/frequency transmission resource, beamforming/precoding information, power control and MCS of the UL transmission, such as through dynamic signaling, e.g. L1 signaling, or through higher layer signaling. For SL transmission, the signaling may indicated whether the SL transmission can take place during the whole sensing subcycle, or only during the active phase of that subcycle, for any particular subcycle.

The signaling support as described above can enable convenient embedding/multiplexing of data with a sensing signal as well as enabling reusing sensing signal for other purposes.

Figure 15:
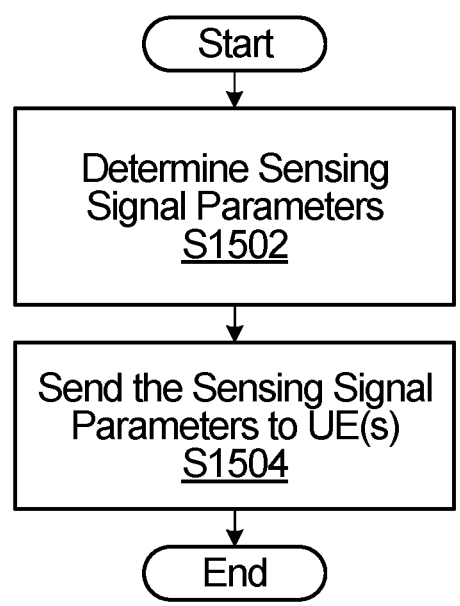
FIG. 15 is a flowchart illustrating an example operation process of an electronic device, according to an embodiment of the present disclosure.

As discussed earlier, in some embodiments, sensing signal parameters may be determined at a network device in a network, as illustrated in FIG. 15 at S1502, and communicated to one or more other network entities such as UEs by the network device at S1504 after the parameters have been determined. In these embodiments, the process illustrated in FIG. 4C may be carried out at the network device. The operation process in FIG. 15 and the operation process in FIG. 4C may also be performed by one or more different electronic devices.

Figure 16:
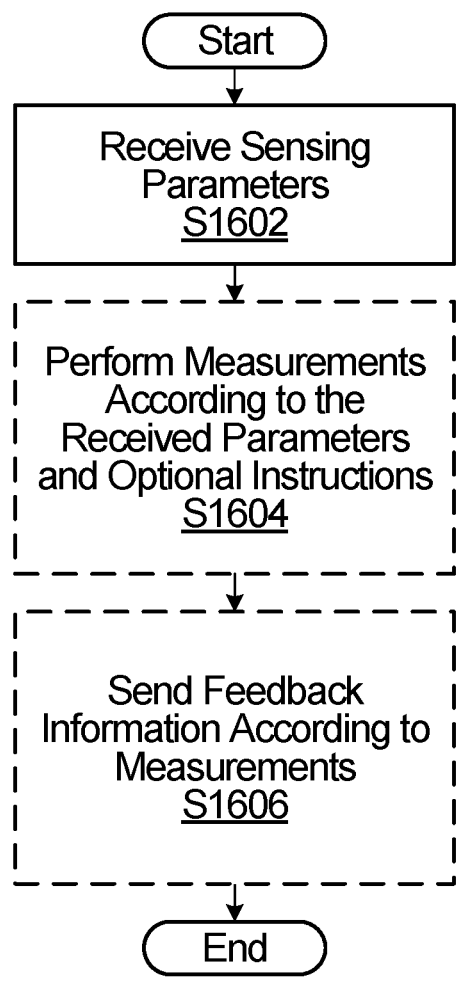
FIG. 16 is a flowchart illustrating an example operation process of an electronic device, according to an embodiment of the present disclosure.

As illustrated in FIG. 16, an electronic device, such as a UE, may receive the sensing signal parameters at S1602, and perform sensing and communication operations according to the received parameters. Optionally, the UE may perform measurements according to the received parameters, and possibly instructions for sensing or communication, at S1604. Based on the measurements, the UE may perform further operations. For example, the UE may optionally provide feedback information to the network such as to the network device from which the UE received the sensing signal parameters, based on the measurement results, at S1606. The network may then re-determine or update one or more signal parameters based on the feedback information, and communicate the re-determined or updated parameters to the UE, and optionally to one or more other UEs or network entities.

While aspects of the description may pertain to half-duplex mode operation, it should be understood that aspects of the above described methodologies can be applied to full duplex mode operation as well.

Some aspects of the present disclosure relate to sensing in a wireless communication network, which allows the network to determine information regarding the surrounding environment. For example, sensing could determine the location, shape and velocity of one or more objects in the environment. These objects may include network entities that communicate within the network and scattering objects that can potentially disrupt communications in the network. A benefit of sensing is that the network can configure communication signals between network entities based on measured properties of the current environment. Wireless communications can potentially be improved when properties of a wireless communication network and its surrounding environment are known.

By way of example, when the location of a transmitter, an intended receiver, and any potential scattering objects are known to the network, the network can determine a trajectory from the transmitter to the intended receiver that avoids the scattering objects or is least impacted by the scattering objects. Based on this trajectory, the network can configure a suitable communication signal for transmission to the intended receiver. Beamforming is one method that can be used to direct signals along a particular trajectory. When the trajectory to the intended receiver has been determined with a desired precision, narrow beamforming can be implemented for communication with that intended receiver. Narrow beamforming can increase the received power at the intended receiver, and reduce interference for other receivers in the network. Having knowledge of the velocity of the intended receiver can also allow the network to predict the future location of the intended receiver and configure future communication signals to that receiver accordingly.

In some implementations, the communication signal is transmitted using a resource configuration selected from the same set of resources as the resource configuration for the sensing signal (for example, in-band sensing). In other implementations, the communication signal is transmitted using a resource configuration selected from a different set of resources as the resource configuration for the sensing signal (for example, out-of-band sensing). In any of these implementations, the sensing signal may have the same frame structure and the same numerology as the communication signal, or have a different frame structure or numerology, or both, than the communication signal.

It should be appreciated that one or more steps in the example methods described herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, or other data.

A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the figures or all of the portions schematically shown in the figures. Moreover, selected features of one example embodiment may be combined with selected features of other example embodiments.

It will be understood that any range of values herein is intended to specifically include any intermediate value or sub-range within the given range, and all such intermediate values and sub-ranges are individually and specifically disclosed.

It will also be understood that the word "a" or "an" is intended to mean "one or more" or "at least one", and any singular form is intended to include plurals herein.

It will be further understood that the term "comprise" or "include", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

The embodiments set forth herein represent information sufficient to practice the disclosed subject matter and illustrate ways of practicing such subject matter. Upon reading the description in light of the accompanying figures, those of skill in the art will understand the concepts of the disclosed subject matter and will recognize applications of these concepts not particularly addressed herein. It should be understood that these concepts and applications fall within the scope of the disclosure.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   transmitting, by a first electronic device, a radio frequency (RF) pulse signal in an active phase of a periodic sensing cycle, the RF pulse signal being defined by a waveform for carrying communication data between the first electronic device and a second electronic device; and
   sensing, by the first electronic device in a passive phase of the periodic sensing cycle, a reflection of the RF pulse signal reflected from an object, the sensed RF pulse signal being at least a portion of the transmitted or reflected RF pulse signal, the portion being equal to or greater than a threshold value for the object being within a sensing range of the first electronic device.

2. The method of claim 1, further comprising receiving, by the first electronic device, a communication signal from the second electronic device during the passive phase, the communication signal being defined by the waveform.

3. The method of claim 1, further comprising receiving a control signaling signal indicative of one or more signal parameters associated with the RF pulse signal such that the sensed RF pulse signal is the at least the portion of the transmitted or reflected RF pulse signal when the object is within the sensing range of the first electronic device.

4. The method of claim 1, wherein the periodic sensing cycle comprises a plurality of subcycles, a first subcycle of the plurality of subcycles comprising a first active phase and a first passive phase, and a second subcycle of the plurality of subcycles comprising a second active phase and a second passive phase.

5. The method of claim 4, wherein the RF pulse signal comprises a signaling portion for signaling parameters associated with a subsequent RF pulse signal to be transmitted by the first electronic device, the signaling portion comprising an indication of one or more of:
   bandwidth;
   frame structure;
   subcycle index of each subcycle that comprises encoded data;
   waveform;
   numerology; or
   pulse shape.

6. An apparatus comprising:
   a transmitter configured to transmit a radio frequency (RF) pulse signal in an active phase of a periodic sensing cycle, the RF pulse signal being defined by a waveform for carrying communication data; and
   a receiver configured to sense, in a passive phase of the periodic sensing cycle, a reflection of the RF pulse signal reflected from an object, the sensed RF pulse signal being at least a portion of the transmitted or reflected RF pulse signal, the portion being equal to or greater than a threshold value for the object being within a sensing range of the apparatus.

7. The apparatus of claim 6, wherein the receiver is further configured to receive a communication signal during the passive phase, the communication signal being defined by the waveform.

8. The apparatus of claim 6, wherein the receiver is further configured to receive a control signaling signal indicative of one or more signal parameters associated with the RF pulse signal such that the sensed RF pulse signal is the at least the portion of the transmitted or reflected RF pulse signal when the object is within the sensing range of the apparatus.

9. The apparatus of claim 6, wherein the periodic sensing cycle comprises a plurality of subcycles, a first subcycle of the plurality of subcycles comprising a first active phase and a first passive phase, and a second subcycle of the plurality of subcycles comprising a second active phase and a second passive phase.

10. The apparatus of claim 9, wherein the RF pulse signal comprises a signaling portion for signaling parameters associated with a subsequent RF pulse signal to be transmitted by the apparatus, the signaling portion comprising an indication of one or more of:
bandwidth;
frame structure;
subcycle index of each subcycle that comprises encoded data;
waveform;
numerology; or
pulse shape.

11. A method comprising:
receiving, by a second electronic device, a radio frequency (RF) pulse signal transmitted from a first electronic device in an active phase of a periodic sensing cycle, the RF pulse signal being defined by a waveform for (i) carrying communication data between the first electronic device and the second electronic device and (ii) sensing by the first electronic device, during a passive phase of the periodic sensing cycle, a reflection of the RF pulse signal reflected from an object, the sensed RF pulse signal being at least a portion of the transmitted or reflected RF pulse signal, the portion being equal to or greater than a threshold value for the object being within a sensing range of the first electronic device; and
transmitting, by the second electronic device in the passive phase of the periodic sensing cycle, a communication signal defined by the waveform.

12. The method of claim 11, further comprising sensing, by the second electronic device, a sensing signal defined by the waveform.

13. The method of claim 11, further comprising transmitting or receiving a control signaling signal indicative of one or more signal parameters associated with the RF pulse signal such that the sensed RF pulse signal is the at least the portion of transmitted or reflected RF pulse signal when the object is within the sensing range of the first electronic device.

14. The method of claim 11, wherein the periodic sensing cycle comprises a plurality of subcycles, a first subcycle of the plurality of subcycles comprising a first active phase and a first passive phase, and a second subcycle of the plurality of subcycles comprising a second active phase and a second passive phase.

15. The method of claim 14, wherein the RF pulse signal comprises a signaling portion for signaling parameters associated with a subsequent RF pulse signal to be transmitted by the first electronic device, the signaling portion comprising an indication of one or more of:
bandwidth;
frame structure;
subcycle index of each subcycle that comprises encoded data;
waveform;
numerology; or
pulse shape.

16. An apparatus comprising:
a receiver configured to receive a radio frequency (RF) pulse signal transmitted from an electronic device in an active phase of a periodic sensing cycle, the RF pulse signal being defined by a waveform for (i) carrying communication data and (ii) sensing by the electronic device, during a passive phase of the periodic sensing cycle, a reflection of the RF pulse signal reflected from an object, the sensed RF pulse signal being at least a portion of the transmitted or reflected RF pulse signal, the portion being equal to or greater than a threshold value for the object being within a sensing range of the electronic device; and
a transmitter configured to transmit, in the passive phase of the periodic sensing cycle, a communication signal defined by the waveform.

17. The apparatus of claim 16, wherein the receiver is further configured to sense a sensing signal defined by the waveform.

18. The apparatus of claim 16, wherein the transmitter or receiver is further configured to transmit or receive a control signaling signal indicative of one or more signal parameters associated with the RF pulse signal such that the sensed RF pulse signal is the at least the portion of transmitted or reflected RF pulse signal when the object is within the sensing range of the electronic device.

19. The apparatus of claim 16, wherein the periodic sensing cycle comprises a plurality of subcycles, a first subcycle of the plurality of subcycles comprising a first active phase and a first passive phase, and a second subcycle of the plurality of subcycles comprising a second active phase and a second passive phase.

20. The apparatus of claim 19, wherein the RF pulse signal comprises a signaling portion for signaling parameters associated with a subsequent RF pulse signal to be transmitted by the first electronic device, the signaling portion comprising an indication of one or more of:
bandwidth;
frame structure;
subcycle index of each subcycle that comprises encoded data;
waveform;
numerology; or
pulse shape.

\* \* \* \* \*